US010220678B2

(12) United States Patent
Miyakoshi et al.

(10) Patent No.: US 10,220,678 B2
(45) Date of Patent: Mar. 5, 2019

(54) AIR CONDITIONING DEVICE FOR VEHICLE

(71) Applicant: Sanden Holdings Corporation, Isesaki-shi, Gunma (JP)

(72) Inventors: Ryo Miyakoshi, Isesaki (JP); Kenichi Suzuki, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 0 days.

(21) Appl. No.: 15/960,870

(22) Filed: Apr. 24, 2018

(65) Prior Publication Data

US 2018/0236845 A1    Aug. 23, 2018

Related U.S. Application Data

(62) Division of application No. 14/914,587, filed as application No. PCT/JP2014/073025 on Sep. 2, 2014.

(30) Foreign Application Priority Data

Sep. 4, 2013    (JP) .................................. 2013-183187

(51) Int. Cl.
   *B60H 1/00* (2006.01)
   *F25B 49/02* (2006.01)
   (Continued)

(52) U.S. Cl.
   CPC ..... *B60H 1/00921* (2013.01); *B60H 1/00385* (2013.01); *B60H 1/00764* (2013.01);
   (Continued)

(58) Field of Classification Search
   CPC . B60H 1/00921; B60H 1/00914; F25B 49/02; F25B 47/022; F25B 2400/0409; F25B 40/00; F25B 6/04; F25B 41/04
   See application file for complete search history.

(56) References Cited

U.S. PATENT DOCUMENTS

| 5,704,219 A | * | 1/1998 | Suzuki | B60H 1/00907 237/2 B |
| 5,778,691 A | * | 7/1998 | Suzuki | B60H 1/00907 62/160 |

(Continued)

FOREIGN PATENT DOCUMENTS

| EP | 1072453 A2 | 1/2001 |
| EP | 1072453 B1 * | 11/2006 ......... B60H 1/00357 |

(Continued)

OTHER PUBLICATIONS

The State Intellectual Property Office of People's Republic of China, First Office Action for Chinese Application No. 201480049031.4, dated Dec. 5, 2016.

(Continued)

*Primary Examiner* — Kun Kai Ma
(74) *Attorney, Agent, or Firm* — Baker Botts L.L.P.

(57) ABSTRACT

There is disclosed an air conditioning device for vehicle in which in a defrosting mode to defrost an outdoor heat exchanger, the defrosting of the outdoor heat exchanger can be achieved without hindrance while maintaining heating of a vehicle interior. A refrigerant discharged from a compressor 2 radiates heat in a radiator 4 and the refrigerant by which heat has been radiated is decompressed and then absorbs heat in an outdoor heat exchanger 7 to heat the vehicle interior. The air conditioning device for vehicle includes an injection circuit 40 which distributes a part of the refrigerant flowing out from the radiator 4 to return the part to the compressor 2. When a controller 32 passes the high-temperature refrigerant through the outdoor heat exchanger 7 to perform defrosting, the controller operates the injection circuit 40 to return the refrigerant to the compressor 2.

13 Claims, 18 Drawing Sheets

(51) Int. Cl.
    *F25B 41/04*         (2006.01)
    *F25B 47/02*         (2006.01)
    *F25B 6/04*           (2006.01)
    *F25B 5/04*           (2006.01)
    *F25B 40/00*         (2006.01)

(52) U.S. Cl.
    CPC ......... *B60H 1/00914* (2013.01); *F25B 41/04* (2013.01); *F25B 47/022* (2013.01); *F25B 49/02* (2013.01); *B60H 2001/00957* (2013.01); *F25B 5/04* (2013.01); *F25B 6/04* (2013.01); *F25B 40/00* (2013.01); *F25B 2341/0662* (2013.01); *F25B 2400/0409* (2013.01); *F25B 2400/0411* (2013.01)

(56) References Cited

U.S. PATENT DOCUMENTS

| | | | | |
|---|---|---|---|---|
| 5,878,589 | A * | 3/1999 | Tanaka | B60H 1/00007 |
| | | | | 165/80.2 |
| 5,996,360 | A * | 12/1999 | Tanaka | B60H 1/00907 |
| | | | | 62/159 |
| 6,047,770 | A * | 4/2000 | Suzuki | B60H 1/00007 |
| | | | | 165/202 |
| 6,237,351 | B1 * | 5/2001 | Itoh | B60H 1/00921 |
| | | | | 62/113 |
| 6,293,123 | B1 * | 9/2001 | Iritani | B60H 1/3205 |
| | | | | 62/197 |
| 6,347,528 | B1 * | 2/2002 | Iritani | B60H 1/00357 |
| | | | | 62/323.1 |
| 9,873,307 | B2 * | 1/2018 | Suzuki | B60H 1/00921 |
| 2005/0120733 | A1 * | 6/2005 | Healy | F25B 1/04 |
| | | | | 62/324.4 |
| 2011/0016896 | A1 * | 1/2011 | Oomura | B60H 1/00785 |
| | | | | 62/155 |
| 2012/0049664 | A1 * | 3/2012 | Yokoyama | B60H 1/00392 |
| | | | | 310/53 |
| 2012/0266622 | A1 * | 10/2012 | Inaba | B60H 1/00899 |
| | | | | 62/186 |
| 2013/0305759 | A1 * | 11/2013 | Tsunoda | F25D 21/004 |
| | | | | 62/151 |
| 2013/0312442 | A1 | 11/2013 | Suzuki et al. | |
| 2013/0312447 | A1 * | 11/2013 | Inaba | F25B 43/00 |
| | | | | 62/324.6 |
| 2014/0041404 | A1 * | 2/2014 | Tsunoda | B60S 1/023 |
| | | | | 62/156 |
| 2014/0053587 | A1 * | 2/2014 | Arii | F25B 41/043 |
| | | | | 62/196.1 |
| 2014/0238067 | A1 * | 8/2014 | Itou | F25B 41/04 |
| | | | | 62/324.6 |
| 2014/0345309 | A1 * | 11/2014 | Ishikawa | F25B 13/00 |
| | | | | 62/155 |
| 2015/0121930 | A1 * | 5/2015 | Kasuya | B60H 1/00921 |
| | | | | 62/238.6 |
| 2015/0151609 | A1 * | 6/2015 | Satou | B60H 1/3204 |
| | | | | 165/63 |
| 2015/0153078 | A1 * | 6/2015 | Lee | F25B 30/02 |
| | | | | 62/324.6 |
| 2015/0300706 | A1 * | 10/2015 | Awa | F25B 29/003 |
| | | | | 62/324.6 |
| 2015/0308462 | A1 * | 10/2015 | Awa | F04F 5/46 |
| | | | | 62/515 |
| 2015/0314668 | A1 * | 11/2015 | Suzuki | F25B 1/10 |
| | | | | 62/160 |

FOREIGN PATENT DOCUMENTS

| | | |
|---|---|---|
| JP | H09-196522 A | 7/1997 |
| JP | 2001-030744 A | 2/2001 |
| JP | 2001-246930 A | 9/2001 |
| JP | 2006-200890 A | 8/2006 |
| JP | 3985384 B2 | 10/2007 |
| JP | 2010-111222 A | 5/2010 |
| JP | 2011-240879 A | 12/2011 |
| JP | 2012-176660 A | 9/2012 |
| JP | 2012-228945 A | 11/2012 |
| JP | 2012-233676 A | 11/2012 |
| JP | 2013-203221 A | 10/2013 |

OTHER PUBLICATIONS

Japan Patent Office, First Notification of Reasons for Refusal for Patent Application No. JP 2013-183187 dated Jun. 6, 2017.
The State Intellectual Property Office of People's Republic of China, Second Office Action for Chinese Application No. 201480049031.4, dated Aug. 21, 2017.

* cited by examiner

P-h DIAGRAM

P-h DIAGRAM

AIR CONDITIONING DEVICE FOR VEHICLE

CROSS-REFERENCE TO RELATED APPLICATIONS

The present application is a divisional of U.S. patent application Ser. No. 14/914,587, which was filed on Feb. 25, 2016, which is a U.S. National Stage Patent Application under 37 U.S.C. § 371 of International Patent Application No. PCT/JP2014/073025, filed on Sep. 2, 2014, which claims the benefit of Japanese Patent Application No. JP 2013-183187, filed on Sep. 4, 2013, the disclosures of which are incorporated herein by reference in their entirety.

TECHNICAL FIELD

The present invention relates to an air conditioning device for vehicle of a heat pump system which conditions air in a vehicle interior.

BACKGROUND ART

Due to actualization of environmental problems in recent years, hybrid cars and electric cars have spread. Furthermore, as an air conditioner which is applicable to such a vehicle, there has been developed an air conditioner which includes a compressor to compress and discharge a refrigerant, a radiator (a condenser) disposed in an air flow passage of a vehicle interior to let the refrigerant radiate heat, a heat absorber (an evaporator) disposed in the air flow passage to let the refrigerant absorb heat, and a refrigerant circuit constituted of an outdoor heat exchanger or the like disposed outside the vehicle interior to let the refrigerant radiate or absorb heat, and which executes respective modes such as a heating mode in which the refrigerant discharged from the compressor radiates heat in the radiator and the refrigerant by which heat has been radiated in this radiator absorbs heat in the outdoor heat exchanger, a dehumidifying and heating mode in which the refrigerant discharged from the compressor radiates heat in the radiator and the refrigerant by which heat has been radiated in this radiator absorbs heat in the heat absorber and the outdoor heat exchanger or only in the heat absorber, a cooling mode in which the refrigerant discharged from the compressor radiates heat in the outdoor heat exchanger and absorbs heat in the heat absorber, and a dehumidifying and cooling mode in which the refrigerant discharged from the compressor radiates heat in the radiator and the outdoor heat exchanger and absorbs heat in the heat absorber (e.g., see Patent Document 1).

Additionally, there has been developed an air conditioner including an injection circuit which distributes a refrigerant flowing out from a radiator, decompresses this distributed refrigerant, performs heat exchange between this refrigerant and the refrigerant flowing out from the radiator, and returns the refrigerant to the middle of compression by a compressor in a heating mode, whereby the refrigerant to be discharged from the compressor is increased, and a heating capability by the radiator improves (e.g., see Patent Document 2).

CITATION LIST

Patent Documents

Patent Document 1: Japanese Patent Application Publication No. 2012-176660

Patent Document 2: Japanese Patent No. 3985384

SUMMARY OF THE INVENTION

Problems to be Solved by the Invention

Here, in the above heating mode, a refrigerant absorbs heat from outdoor air in an outdoor heat exchanger. That is, the outdoor heat exchanger functions as an evaporator, and hence water in the outdoor air adheres as frost to the outdoor heat exchanger, and grows therein. When the frost is generated in the outdoor heat exchanger, the frost becomes an insulating material to obstruct heat exchange between the outdoor air and the refrigerant, and hence in such cases, a defrosting mode is executed in which a high-temperature refrigerant from a compressor is passed through the outdoor heat exchanger to remove the frost. However, in this case, heat is absorbed in a heat absorber, and hence air to be blown out through an air flow passage to a vehicle interior is cooled, thereby causing the problem that heating of the vehicle interior is obstructed.

The present invention has been developed to solve such a conventional technical problem, and an object thereof is to provide an air conditioning device for vehicle in which in a defrosting mode to defrost an outdoor heat exchanger, the defrosting of the outdoor heat exchanger can be achieved without hindrance while maintaining heating of a vehicle interior.

Means for Solving the Problems

An air conditioning device for vehicle of the present invention includes a compressor which compresses a refrigerant, an air flow passage through which air to be supplied to a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, and control means, this control means being configured to let the refrigerant discharged from the compressor radiate heat in the radiator, decompress the refrigerant by which heat has been radiated and then let the refrigerant absorb heat in the outdoor heat exchanger, thereby heating the vehicle interior, the air conditioning device for vehicle including an injection circuit which distributes a part of the refrigerant flowing out from the radiator to return the part of the refrigerant to the compressor, the air conditioning device for vehicle being characterized in that the control means operates the injection circuit to return the refrigerant to the compressor, when the high-temperature refrigerant is passed through the outdoor heat exchanger to perform defrosting.

The air conditioning device for vehicle of the invention of claim 2 is characterized in that in the above invention, in a case where there is a heating required for the vehicle interior, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means operates the injection circuit.

The air conditioning device for vehicle of the invention of claim 3 is characterized in that in the invention of claim 1, in a case where there is a heating required for the vehicle interior, the control means executes a hot gas defrosting mode in which a part of the refrigerant discharged from the compressor is distributed to flow into the outdoor heat exchanger and radiate heat therein without flowing through the radiator and the refrigerant by which heat has been radiated returns to the compressor, and the control means operates the injection circuit.

The air conditioning device for vehicle of the invention of claim 4 is characterized in that in the above respective inventions, the air conditioning device for vehicle includes an outdoor blower which passes outdoor air through the outdoor heat exchanger, and when the control means defrosts the outdoor heat exchanger, the control means operates the outdoor blower in a case where a temperature of the outdoor heat exchanger is a predetermined value or more, and stops the outdoor blower in a case where the temperature is lower than the predetermined value.

The air conditioning device for vehicle of the invention of claim 5 is characterized in that in the invention of claim 2 or claim 3, in a case where an outdoor air temperature is a predetermined value or more, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means does not operate the injection circuit.

The air conditioning device for vehicle of the invention of claim 6 is characterized in that in the inventions of claim 2 to claim 5, in a case where there is not the heating required for the vehicle interior, the control means executes a simple hot gas defrosting mode in which the refrigerant discharged from the compressor radiates heat in the outdoor heat exchanger and the refrigerant by which heat has been radiated returns to the compressor, and the control means does not operate the injection circuit; or the control means executes a hot gas defrosting mode in which a part of the refrigerant discharged from the compressor is distributed to flow into the outdoor heat exchanger and radiate heat therein without flowing through the radiator and the refrigerant by which heat has been radiated returns to the compressor, and the control means does not operate the injection circuit.

The air conditioning device for vehicle of the invention of claim 7 is characterized in that in the above respective inventions, in a case where a power is supplied from an external power source to the compressor or a battery which supplies the power to drive the compressor, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means operates the injection circuit; or the control means executes a hot gas defrosting mode in which a part of the refrigerant discharged from the compressor is distributed to flow into the outdoor heat exchanger and radiate heat therein without flowing through the radiator and the refrigerant by which heat has been radiated returns to the compressor, and the control means operates the injection circuit, and in a case where the power is not supplied from the external power source, the control means executes a simple hot gas defrosting mode in which the refrigerant discharged from the compressor radiates heat in the outdoor heat exchanger and the refrigerant by which heat has been radiated returns to the compressor, and the control means does not operate the injection circuit; or the control means executes the hot gas defrosting mode and does not operate the injection circuit.

The air conditioning device for vehicle of the invention of claim 8 is characterized in that in the above invention, in a case where the power is not supplied from the external power source and a remaining amount of the battery is small, the control means executes the simple hot gas defrosting mode and does not operate the injection circuit, or the control means executes the hot gas defrosting mode and does not operate the injection circuit.

The air conditioning device for vehicle of the invention of claim 9 is characterized in that in the above respective inventions, the control means executes a reverse cycle defrosting mode in which the refrigerant discharged from the compressor radiates heat in the outdoor heat exchanger and the refrigerant by which heat has been radiated is decompressed and then absorbs heat in the heat absorber, and the control means does not operate the injection circuit, until a vehicle interior temperature becomes lower than a predetermined value, and in a case where the vehicle interior temperature is lower than the predetermined value, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means operates the injection circuit.

The air conditioning device for vehicle of the invention of claim 10 is characterized in that in the above respective inventions, the control means stops introduction of outdoor air into the air flow passage, in a case where a vehicle interior temperature is lower than a predetermined value or a case where it is necessary to heat the vehicle interior, when the control means defrosts the outdoor heat exchanger.

The air conditioning device for vehicle of the invention of claim 11 is characterized in that in the invention of claim 2, claim 3 or claim 5, the control means stops introduction of outdoor air into the air flow passage, when the control means executes the dehumidifying and cooling type defrosting mode or the hot gas defrosting mode.

The air conditioning device for vehicle of the invention of claim 12 is characterized in that in the above respective inventions, the control means defrosts the outdoor heat exchanger in a case where a vehicle speed is a predetermined value or less.

Advantageous Effect of the Invention

According to the present invention, there is provided an air conditioning device for vehicle including a compressor which compresses a refrigerant, an air flow passage through which air to be supplied to a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, and control means, and this control means lets the refrigerant discharged from the compressor radiate heat in the radiator, decompresses the refrigerant by which heat has been radiated and then lets the refrigerant absorb heat in the outdoor heat exchanger, thereby heating the vehicle interior. The air conditioning device for vehicle includes an injection circuit which distributes a part of the refrigerant flowing out from the radiator to return the part of the refrigerant to the compressor, and the control means operates the injection circuit to return the refrigerant to the compressor, when the high-temperature refrigerant is passed through the outdoor heat exchanger to perform defrosting.

Therefore, for example, as in the invention of claim 2, in a case where there is a heating required for the vehicle interior, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means operates the injection circuit, whereby the injection circuit can return a part of the refrigerant flowing out from the radiator to the compressor, improve a heating capability by the radiator and achieve maintaining of a vehicle interior temperature.

Additionally, the defrosting of the outdoor heat exchanger can be executed without hindrance, and hence increase of power consumption due to lengthening of the defrosting mode can be avoided effectively especially in an electric car or a hybrid car.

Additionally, in a case where there is disposed a circuit which can supply the refrigerant discharged from the compressor directly to the outdoor heat exchanger and, for example, as in the invention of claim 3, in a case where there is a heating required for the vehicle interior, the control means executes a hot gas defrosting mode in which a part of the refrigerant discharged from the compressor is distributed to flow into the outdoor heat exchanger and radiate heat therein without flowing through the radiator and the refrigerant by which heat has been radiated returns to the compressor, and the control means operates the injection circuit. In consequence, without performing the heat absorption in the heat absorber, the injection circuit can improve the heating capability in the radiator effectively especially in a situation where the vehicle interior temperature is remarkably low.

In this case, as in the invention of claim 4, the air conditioning device for vehicle includes an outdoor blower which passes outdoor air through the outdoor heat exchanger, and when the control means defrosts the outdoor heat exchanger, the control means operates the outdoor blower which passes the outdoor air through the outdoor heat exchanger in a case where a temperature of the outdoor heat exchanger is a predetermined value or more, and the control means stops the outdoor blower in a case where the temperature is lower than the predetermined value. In consequence, it is possible to prevent or inhibit the disadvantage that steam generated by the defrosting adheres to the outdoor heat exchanger again.

Additionally, as in the invention of claim 5, in a case where an outdoor air temperature is a predetermined value or more, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means does not operate the injection circuit. Consequently, under an environment where an outdoor air temperature is high and the heating capability in the vehicle interior is easy to be maintained, more refrigerant can be supplied to the outdoor heat exchanger without operating the injection circuit, and the defrosting can be promoted.

On the other hand, in a case where there is not the heating required for the vehicle interior, as in the invention of claim 6, the control means executes a simple hot gas defrosting mode in which the refrigerant discharged from the compressor radiates heat in the outdoor heat exchanger and the refrigerant by which heat has been radiated returns to the compressor, and the control means does not operate the injection circuit; or the control means executes a hot gas defrosting mode in which a part of the refrigerant discharged from the compressor is distributed to flow into the outdoor heat exchanger and radiate heat therein without flowing through the radiator and the refrigerant by which heat has been radiated returns to the compressor, and the control means does not operate the injection circuit. Consequently, the defrosting of the outdoor heat exchanger can rapidly be executed to minimize the power consumption remarkably effectively in the electric car or the like.

Additionally, in the electric car or the hybrid car which enables so-called plug-in to supply a power from an external power source to the compressor or a battery which supplies the power to drive the compressor, as in the invention of claim 7, in a case where the power is supplied from the external power source, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means operates the injection circuit, or the control means executes a hot gas defrosting mode in which a part of the refrigerant discharged from the compressor is distributed to flow into the outdoor heat exchanger and radiate heat therein without flowing through the radiator and the refrigerant by which heat has been radiated returns to the compressor, and the control means operates the injection circuit; and in a case where the power is not supplied from the external power source, the control means executes a hot gas defrosting mode in which the refrigerant discharged from the compressor radiates heat in the outdoor heat exchanger and the refrigerant by which heat has been radiated returns to the compressor, and the control means operates the injection circuit; and in the case where the power is not supplied from the external power source, the control means executes a simple hot gas defrosting mode in which the refrigerant discharged from the compressor radiates heat in the outdoor heat exchanger and the refrigerant by which heat has been radiated returns to the compressor, and the control means does not operate the injection circuit, or the control means executes hot gas defrosting mode and does not operate the injection circuit. Consequently, as in the invention of claim 2 or claim 3, during the plug-in, the heating of the vehicle interior can be maintained while defrosting the outdoor heat exchanger in the dehumidifying and cooling type defrosting mode or the hot gas defrosting mode. Furthermore, when the plug-in is not performed, the control means can pass all the refrigerant through the outdoor heat exchanger to rapidly perform the defrosting without operating the injection circuit in the simple hot gas defrosting mode or the hot gas defrosting mode, so that it is possible to decrease the power consumption.

In this case, as in the invention of claim 8, in a case where the power is not supplied from the external power source and a remaining amount of the battery is small, the control means executes the simple hot gas defrosting mode and does not operate the injection circuit, or the control means executes the hot gas defrosting mode and does not operate the injection circuit. Consequently, in the case where the plug-in is not performed and the remaining amount of the battery is small, the control means executes the simple hot gas defrosting mode or the hot gas defrosting mode in which the injection circuit is not operated, thereby precisely enabling defrosting control in which it is judged whether or not the plug-in is performed and additionally, the remaining amount of the battery is judged.

Additionally, as in the invention of claim 9, the control means executes a reverse cycle defrosting mode in which the refrigerant discharged from the compressor radiates heat in the outdoor heat exchanger and the refrigerant by which heat has been radiated is decompressed and then absorbs heat in the heat absorber, and the control means does not operate the injection circuit, until a vehicle interior temperature becomes lower than a predetermined value, and in a case where the vehicle interior temperature is lower than the predetermined value, the control means executes the dehumidifying and cooling type defrosting mode and also operates the injection circuit to let the refrigerant radiate heat in the radiator. Consequently, it is possible to achieve the control which satisfies both of the rapid defrosting of the outdoor heat exchanger and the maintaining of the heating of the vehicle interior.

Additionally, as in the invention of claim 10, the control means stops introduction of outdoor air into the air flow passage, in a case where a vehicle interior temperature is lower than a predetermined value or a case where it is necessary to heat the vehicle interior, when the control means defrosts the outdoor heat exchanger. Consequently, in a situation where the vehicle interior temperature is low, the introduction of the outdoor air having a low temperature can be stopped, and the maintaining of the heating capability can be achieved.

Additionally, as in the invention of claim 11, the control means stops the introduction of the outdoor air into the air flow passage, also when the control means executes the dehumidifying and cooling type defrosting mode or the hot gas defrosting mode. Consequently, it is similarly possible to achieve the maintaining of the heating capability.

Furthermore, as in the invention of claim 12, the control means defrosts the outdoor heat exchanger in a case where a vehicle speed is a predetermined value or less. Consequently, in a situation where less outdoor air flows through the outdoor heat exchanger, the defrosting can be performed, and it is possible to improve a defrosting effect.

MODE FOR CARRYING OUT THE INVENTION

Hereinafter, embodiments of the present invention will be described in detail with reference to the drawings.

Embodiment 1

Figure 1:
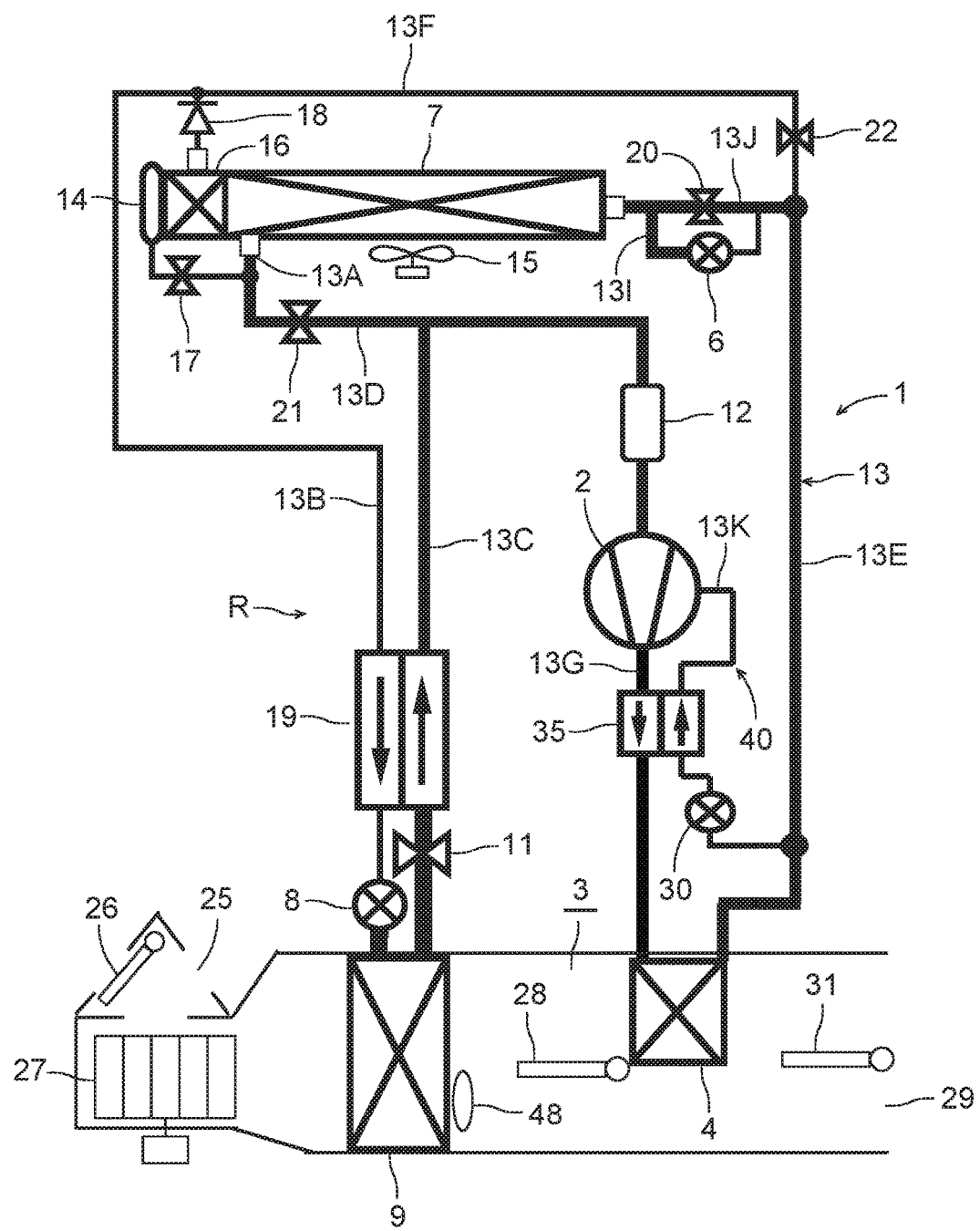
FIG. 1 is a constitutional view of an air conditioning device for vehicle of one embodiment to which the present invention is applied.

FIG. 1 shows a constitutional view of an air conditioning device for vehicle 1 of one embodiment of the present invention. In this case, a vehicle of the embodiment to which the present invention is applied is an electric car (EV) which does not have an engine (an internal combustion engine), and runs by driving an electric motor for running by a power charged in a battery (which is not shown), and the air conditioning device for vehicle 1 of the present invention is also driven by the power of the battery. That is, in the electric car in which heating cannot be performed by waste heat of the engine, the air conditioning device for vehicle 1 of the embodiment selectively executes respective operation modes of heating, dehumidifying and heating, dehumidifying and cooling, cooling, and the like by a heat pump operation in which a refrigerant circuit is used.

It is to be noted that the vehicle is not limited to the electric car, and the present invention is also effective for a so-called hybrid car in which the engine is used together with the electric motor for the running, and is, needless to say, further applicable also to a usual car which runs by the engine.

The air conditioning device for vehicle 1 of the embodiment performs air conditioning (heating, cooling, dehumidifying, and ventilation) of a vehicle interior in the electric car, and there are successively connected, by a refrigerant pipe 13, an electric compressor 2 which compresses a refrigerant, a radiator 4 disposed in an air flow passage 3 of an HVAC unit 10 in which vehicle interior air is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling (let the refrigerant radiate heat) and function as an evaporator during the heating (let the refrigerant absorb heat), an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, so that a refrigerant circuit R is constituted. It is to be noted that in the outdoor heat exchanger 7, an outdoor blower 15 is disposed which performs the heat exchange between the outdoor air and the refrigerant.

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 is branched before a refrigerant pipe 13I connected to the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, the refrigerant pipe 13I positioned between the refrigerant pipe 13E and the outdoor heat exchanger 7 and connected to the outdoor expansion valve 6 is connected to a bypass pipe 13J in parallel with the outdoor expansion valve 6, and in the bypass pipe 13J, there is disposed a solenoid valve (an opening/closing valve) 20 which is opened in a cooling mode and bypasses the outdoor expansion valve 6 to pass the refrigerant.

Additionally, the refrigerant pipe 13E immediately after the pipe is extended out from the radiator 4 (before the pipe is branched into refrigerant pipes 13F and 13I) is branched, and this branched refrigerant pipe 13K communicates to be connected to the middle of compression by the compressor 2 via an injection expansion valve 30 constituted of an electric valve for injection control. Further, the refrigerant pipe 13K between an outlet side of the injection expansion valve 30 and the compressor 2 is disposed in a heat exchange relation with a refrigerant pipe 13G positioned on a discharge side of the compressor 2, and both the pipes constitute a discharge side heat exchanger 35.

The refrigerant pipe 13K, the injection expansion valve 30 and the discharge side heat exchanger 35 constitute an injection circuit 40. The injection circuit 40 is a circuit which distributes a part of the refrigerant flowing out from the radiator 4 to return the part of the refrigerant to the middle of the compression by the compressor 2 (gas injection), and in a case where the injection circuit 40 operates, the injection expansion valve 30 opens, and a part of the refrigerant flowing out from the radiator 4 is distributed to the refrigerant pipe 13K.

The injection expansion valve 30 decompresses the refrigerant flowing into the refrigerant pipe 13K, and then the refrigerant flows into the discharge side heat exchanger 35. The refrigerant flowing into the discharge side heat exchanger 35 is discharged from the compressor 2 to the refrigerant pipe 13G, performs heat exchange with the refrigerant before flowing into the radiator 4, and absorbs heat from the refrigerant flowing through the refrigerant pipe 13G to evaporate. In the discharge side heat exchanger 35, the refrigerant distributed to the refrigerant pipe 13K evaporates, whereby the gas injection into the compressor 2 is performed.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to adjust a degree of flow of the indoor air or the outdoor air through the radiator 4. Furthermore, in the air flow passage 3 on an air downstream side of the radiator 4, there is formed each outlet (represented by an outlet 29 in FIG. 1) of foot (air is blown out toward each foot of a passenger), vent (the air is blown out toward an upper part of a passenger's body) or defroster (the air is blown out to an inner surface of windshield glass), and in the outlet 29, an outlet changing damper 31 is disposed to perform changing control of blowing of the air from each outlet mentioned above.

Figure 2:
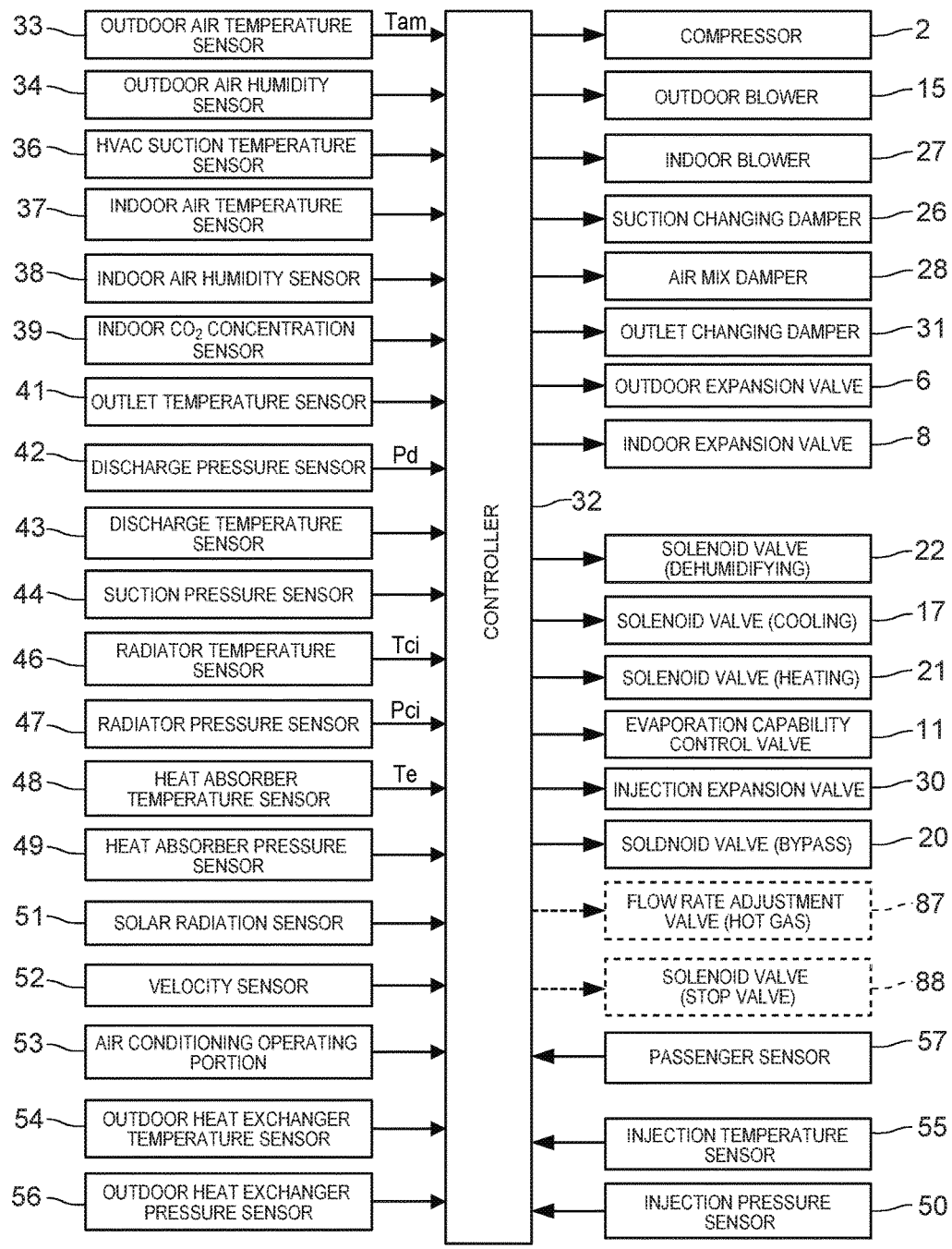
FIG. 2 is a block diagram of an electric circuit of a controller of the air conditioning device for vehicle of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor which detects a temperature of the radiator 4 (the temperature of the refrigerant which has just flowed out from the radiator 4 or the temperature of the radiator 4 itself or the temperature of the air which has just been heated in the radiator 4), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the refrigerant which has just flowed out from the heat absorber 9 or the temperature of the heat absorber 9 itself or the temperature of the air which has just been cooled in the heat absorber 9), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a vehicle speed), an air conditioning operating portion 53 to set the changing of the predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

Additionally, the input of the controller 32 is further connected to respective outputs of an injection pressure sensor 50 which detects a pressure of an injection refrigerant flowing into the refrigerant pipe 13K of the injection circuit 40 and flowing through the discharge side heat exchanger 35 to return to the middle of the compression by the compressor 2, and an injection temperature sensor 55 which detects a temperature of the injection refrigerant. Furthermore, the input of the controller 32 is also connected to an output of a passenger sensor 57 which detects whether or not the passenger is in the vehicle.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the injection expansion valve 30, and the evaporation capability control valve 11. Further, the controller 32 controls these components on the basis of the outputs of the respective sensors and the setting input by the air conditioning operating portion 53.

Next, an operation of the air conditioning device for vehicle 1 of the embodiment having the abovementioned constitution will be described. The controller 32 changes and executes respective roughly divided air conditioning operation modes such as a heating mode, a dehumidifying and heating mode, an internal cycle mode, a dehumidifying and cooling mode, and a cooling mode, and a defrosting mode. First, the respective air conditioning operation modes will be described.

(1) Flow of Refrigerant of Heating Mode

When the heating mode is selected by the controller 32 (automatically) or a manual operation to the air conditioning operating portion 53, the controller 32 opens the solenoid valve 21 and closes the solenoid valve 17, the solenoid valve 22 and the solenoid valve 20. Further, the compressor 2 and the respective blowers 15 and 27 are operated, and the air mix damper 28 has a state where the air blown out from the indoor blower 27 is passed through the radiator 4. In consequence, a high-temperature high-pressure gas refrigerant discharged from the compressor 2 flows through the discharge side heat exchanger 35 and then flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then a part of the refrigerant is distributed to the refrigerant pipe 13K of the injection circuit 40, and mainly flows through the refrigerant pipe 13E to reach the outdoor expansion valve 6. It is to be noted that a function and an operation of the injection circuit 40 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15 (heat pump). Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating of the vehicle interior is performed.

In the embodiment, the controller 32 controls a number of revolution of the compressor 2 on the basis of a refrigerant pressure Pci of the radiator 4 which is detected by the radiator pressure sensor 47 (or the discharge pressure sensor 42) and a target radiator pressure PCO, also controls a valve position of the outdoor expansion valve 6 on the basis of a volume of air to be passed through the radiator 4 and an after-mentioned target outlet temperature, and controls a subcool degree of the refrigerant in the outlet of the radiator 4. It is to be noted that the valve position of the outdoor expansion valve 6 may be controlled on the basis of a temperature of the radiator 4 or an outdoor air temperature in place of or in addition to the above conditions.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating of the vehicle interior are performed.

In the embodiment, the controller 32 controls the number of revolution of the compressor 2 on the basis of the refrigerant pressure Pci of the radiator 4 (the high pressure of the refrigerant circuit R) which is detected by the radiator pressure sensor 47 (or the discharge pressure sensor 42) and the target radiator pressure PCO, and also controls the valve position of the outdoor expansion valve 6 on the basis of the temperature of the heat absorber 9 (a heat absorber temperature Te) which is detected by the heat absorber temperature sensor 48 and a target heat absorber temperature TEO which is a target value of the temperature of the heat absorber 9.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating of the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability deteriorates.

The controller 32 controls the number of revolution of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2. It is to be noted that also in this internal cycle mode, the gas injection by the injection circuit 40 is not performed, and hence the injection expansion valve 30 is shut off (the shut off position).

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Furthermore, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows into the radiator 4 through the discharge side heat exchanger 35. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator (a radiation capability is lower than that during the heating), and hence the dehumidifying and cooling in the vehicle interior are performed.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (the radiator pressure Pci) of the radiator 4. It is to be noted that also in this dehumidifying and cooling mode, the gas injection by the injection circuit 40 is not performed, and hence the injection expansion valve 30 is shut off (the shut off position).

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling), and the air mix damper 28 has a state where the air is not passed through the radiator 4. In consequence, the high-temperature high-pressure gas refrigerant discharged from the compressor 2 flows into the radiator 4 through the discharge side heat exchanger 35. The air in the air flow passage 3 is not passed through the radiator 4, the refrigerant therefore only passes the radiator, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the number of revolution of the compressor 2 on the basis of the temperature of the heat absorber 9 which is detected by the heat absorber temperature sensor 48. It is to be noted that also in this cooling mode, the gas injection by the injection circuit 40 is not performed, and hence the injection expansion valve 30 is shut off (the shut off position).

(6) Changing Control of Air Conditioning Operation Modes

At startup, the controller 32 selects the operation mode on the basis of an outdoor air temperature Tam detected by the outdoor air temperature sensor 33 and a target outlet temperature TAO. Additionally, after the startup, the controller selects and changes the above respective operation modes in accordance with a change of an environment or setting conditions of the outdoor air temperature Tam, the target outlet temperature TAO or the like. In this case, the controller 32 basically shifts from the heating mode to the dehumidifying and heating mode or from the dehumidifying and heating mode to the heating mode, shifts from the dehumidifying and heating mode to the dehumidifying and cooling mode or from the dehumidifying and cooling mode to the dehumidifying and heating mode, and shifts from the dehumidifying and cooling mode to the cooling mode or from the cooling mode to the dehumidifying and cooling mode, but when the controller shifts from the dehumidifying and heating mode to the dehumidifying and cooling mode and shifts from the dehumidifying and cooling mode to the dehumidifying and heating mode, the controller shifts via the above internal cycle mode. Additionally, the controller might shift from the cooling mode to the internal cycle mode or from the internal cycle mode to the cooling mode.

(7) Gas Injection by Injection Circuit

Next, the gas injection to the compressor 2 by the injection circuit 40 will be described. When the injection expansion valve 30 is open, the refrigerant, which flows out from the radiator 4 to enter the refrigerant pipe 13E and is then distributed to flow into the refrigerant pipe 13K of the injection circuit 40, is decompressed by the injection expansion valve 30 to enter the discharge side heat exchanger 35, performs therein heat exchange with the refrigerant discharged from the compressor 2 (the refrigerant discharged from the compressor 2 before flowing into the radiator 4), and absorbs heat to evaporate. Afterward, the evaporated gas refrigerant is further compressed together with the refrigerant which returns to the middle of the compression by the compressor 2 and is sucked from the accumulator 12 to be compressed, and then the refrigerant is discharged from the compressor 2 to the refrigerant pipe 13G again.

When the refrigerant is returned from the injection circuit 40 to the middle of the compression by the compressor 2, an amount of the refrigerant to be discharged from the compressor 2 increases, and hence the heating capability in the radiator 4 improves. Additionally, the refrigerant is distributed to the injection circuit 40. Thus, a refrigerant flow rate of the outdoor heat exchanger 7 or the heat absorber 9 decreases, and hence, temperature drop of the heat absorber 9 is suppressed.

On the other hand, when a liquid refrigerant returns to the compressor 2, liquid compression is caused, and hence the refrigerant to be returned from the injection circuit 40 to the compressor 2 has to be a gas. Therefore, the controller 32 monitors a superheat degree of the refrigerant toward the middle of the compression by the compressor 2 from the pressure and the temperature of the refrigerant after the discharge side heat exchanger 35 which are detected by the injection pressure sensor 50 and the injection temperature sensor 55, respectively, and the controller controls the valve position of the injection expansion valve 30 so that a predetermined superheat degree is applied in the heat exchange with the discharged refrigerant. However, in the embodiment, the discharge side heat exchanger 35 performs heat exchange between the remarkably high-temperature refrigerant discharged from the compressor 2 before flowing into the radiator 4 and the refrigerant flowing through the injection circuit 40, and hence a large heat exchange amount can be obtained. Therefore, even when the valve position of the injection expansion valve 30 is increased to increase an injection amount, the refrigerant can sufficiently evaporate in the discharge side heat exchanger 35, and a required superheat degree can be obtained.

In consequence, as compared with a conventional case where heat exchange is performed between the refrigerant after the radiator and the injection refrigerant, a gas injection amount to the compressor 2 can sufficiently be acquired, and the amount of the refrigerant to be discharged from the compressor 2 can be increased to achieve the improvement of the heating capability.

(8) Defrosting Mode (Embodiment 1)

Next, the defrosting mode of the air conditioning device for vehicle 1 of the embodiment will be described with reference to FIG. 3 to FIG. 11. In the above heating mode or the dehumidifying and heating mode, the refrigerant evaporates in the outdoor heat exchanger 7, and hence frost grows. When the frost grows in the outdoor heat exchanger 7, the heat exchange with the outdoor air is obstructed, and hence the defrosting mode of the outdoor heat exchanger 7 mentioned below is executed. In the case of this embodiment, the controller 32 has a reverse cycle defrosting mode, a first dehumidifying and cooling type defrosting mode and a second dehumidifying and cooling type defrosting mode as the defrosting modes, and switches and executes these modes in accordance with a situation. It is to be noted that both of the first dehumidifying and cooling type defrosting mode and the second dehumidifying and cooling type defrosting mode are included in a dehumidifying and cooling type defrosting mode of the present invention (a simple hot gas defrosting mode and a hot gas defrosting mode will be described in another embodiment).

(8-1) Flow of Refrigerant of Reverse Cycle Defrosting Mode

First, flow of the refrigerant of the reverse cycle defrosting mode will be described. The flow of the refrigerant in this reverse cycle defrosting mode is similar to that of the abovementioned cooling mode. That is, in the reverse cycle defrosting mode, the controller 32 opens the solenoid valve 20 and the solenoid valve 17 and closes the solenoid valve 21 and the solenoid valve 22. Further, the controller operates the compressor 2 and the respective blowers 15 and 27 and the air mix damper 28 has a state where the air is not passed through the radiator 4 (MC).

In consequence, the high-temperature high-pressure gas refrigerant discharged from the compressor 2 flows into the radiator 4 through the discharge side heat exchanger 35, but the air in the air flow passage 3 is not passed through the radiator 4, and hence the refrigerant only passes this radiator, and the refrigerant flowing out from the radiator 4 flows through the refrigerant pipe 13E to reach the solenoid valve 20 and the outdoor expansion valve 6. At this time, the solenoid valve 20 is opened, and hence the refrigerant bypasses the outdoor expansion valve 6 to pass the bypass pipe 13J, flows into the outdoor heat exchanger 7 as it is to radiate heat, and condenses to liquefy. The heat radiated at this time melts the frost adhered to the outdoor heat exchanger 7.

The refrigerant flowing out from the outdoor heat exchanger 7 flows from the refrigerant pipe 13A through the solenoid valve 17 to successively pass the receiver drier portion 14 and the subcooling portion 16, flows through the check valve 18 to enter the refrigerant pipe 13B, and flows through the internal heat exchanger 19 to reach the indoor expansion valve 8. The refrigerant is decompressed in the indoor expansion valve 8, flows into the heat absorber 9 to evaporate, absorbs heat from the air passing through the air flow passage 3, flows through the evaporation capability control valve 11, the internal heat exchanger 19 and the refrigerant pipe 13C to reach the accumulator 12, and flows therethrough to be sucked into the compressor 2, thereby repeating this circulation.

Figure 3:
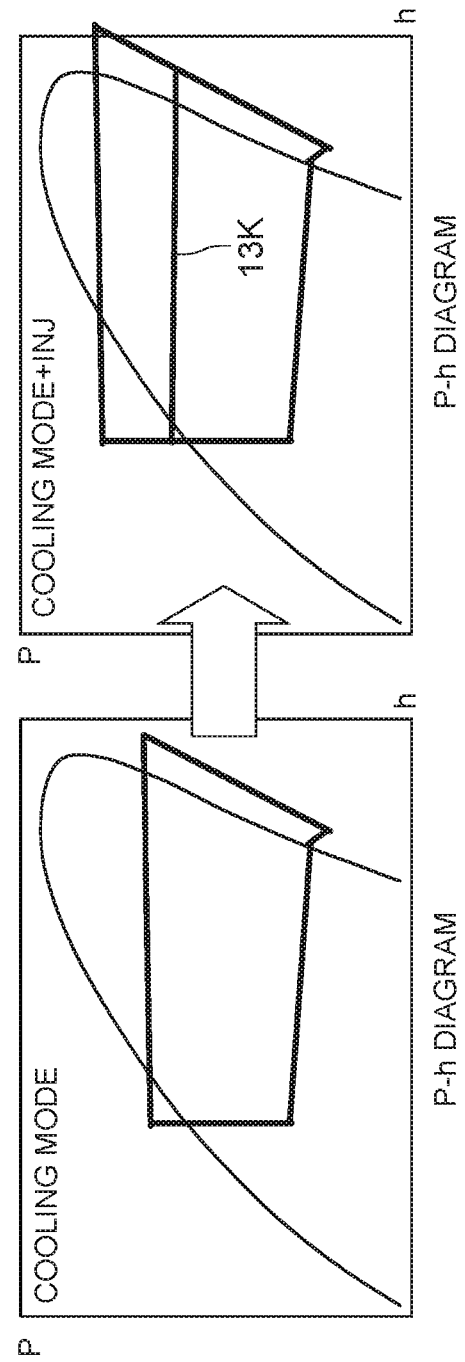
FIG. 3 is a P-h diagram of the air conditioning device for vehicle of FIG. 1 in a reverse cycle defrosting mode.
Figure 10:
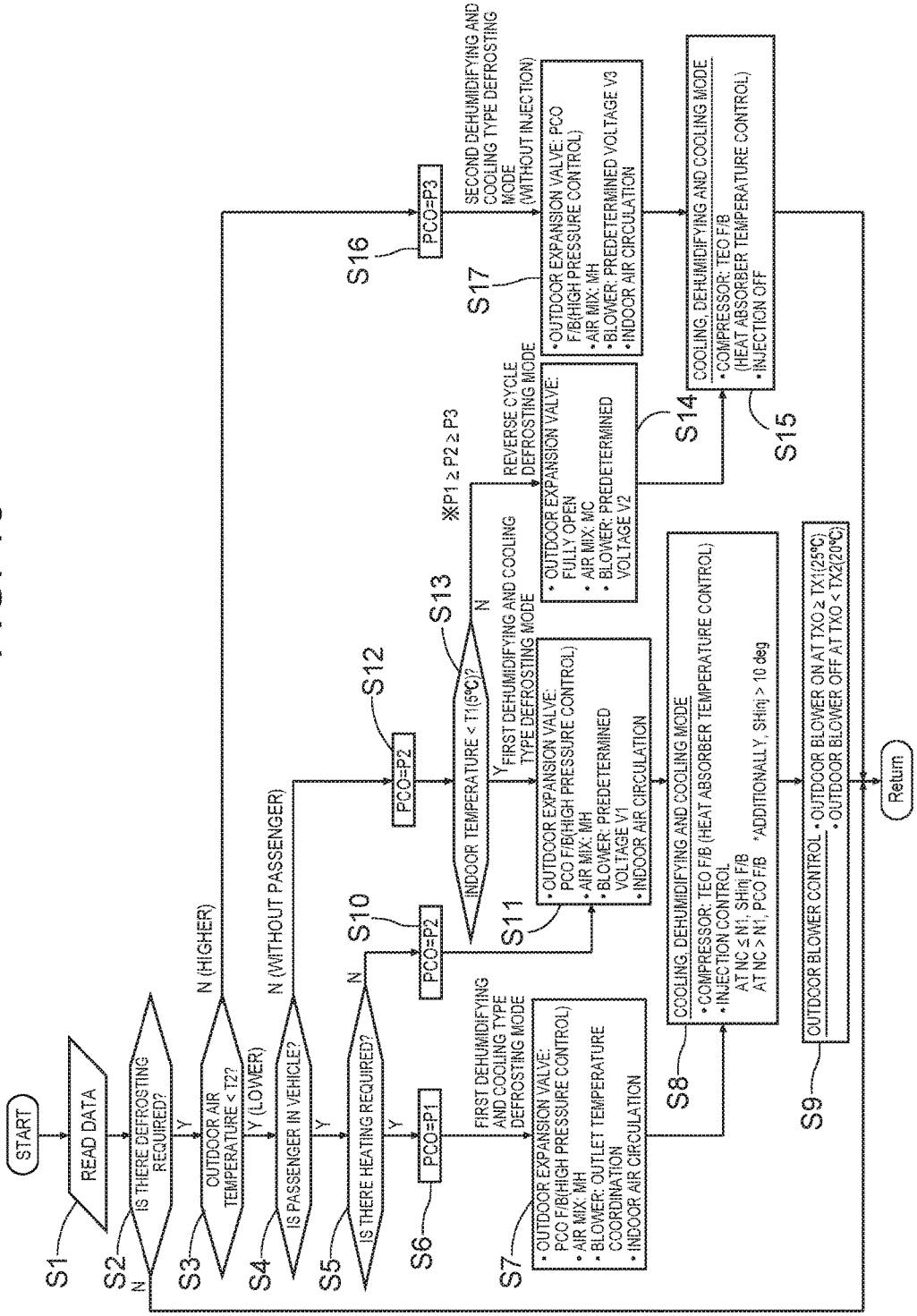
FIG. 10 is a flowchart to explain an operation concerning defrosting control of the controller of FIG. 2.

It is to be noted that in the after-mentioned reverse cycle defrosting mode of the embodiment, the injection circuit 40 is not operated (step S15 of FIG. 10). However, in place of the after-mentioned first dehumidifying and cooling type defrosting mode (step S7 and step S11 of FIG. 10, step S27 of FIG. 14, and step S52 of FIG. 17), the reverse cycle defrosting mode is performed, and in this case, the injection circuit 40 may be operated. FIG. 3 shows a P-h diagram in the reverse cycle defrosting mode of this case, and a left side shows that the gas injection is not performed (the aftermentioned reverse cycle defrosting mode of the embodiment) and a right side shows that the gas injection is performed, respectively. A part denoted with 13K in the drawing shows the refrigerant subjected to the gas injection. As apparent from this drawing, in a case where the injection circuit 40 performs the gas injection (the right side), it can be expected that a defrosting capability of the outdoor heat exchanger 7 is improved (an upper side of the P-h diagram) as compared with a case where the gas injection is not performed (the left side). On the other hand, a cooling operation (a lower side of the P-h diagram) does not much change.

(8-2) Flow of Refrigerant of First Dehumidifying and Cooling Type Defrosting Mode Next, flow of the refrigerant of the first dehumidifying and cooling type defrosting mode will be described. The flow of the refrigerant in this first dehumidifying and cooling type defrosting mode is similar to that in the abovementioned dehumidifying and cooling mode. That is, in the first dehumidifying and cooling type defrosting mode, the controller 32 opens the solenoid valve 17 and closes the solenoid valve 21, the solenoid valve 22 and the solenoid valve 20. Further, the compressor 2 and the respective blowers 15 and 27 are operated, and the air mix damper 28 has the state where the air blown out from the indoor blower 27 is all passed through the radiator 4 (MH).

In consequence, the high-temperature high-pressure gas refrigerant discharged from the compressor 2 flows into the radiator 4 through the discharge side heat exchanger 35. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy. The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 radiates heat therein, and condenses to liquefy. The heat radiated at this time melts the frost adhered to the outdoor heat exchanger 7.

The refrigerant flowing out from the outdoor heat exchanger 7 flows from the refrigerant pipe 13A through the solenoid valve 17 to successively flow into the receiver drier portion 14 and the subcooling portion 16, flows through the check valve 18 to enter the refrigerant pipe 13B, and flows through the internal heat exchanger 19 to reach the indoor expansion valve 8. The refrigerant is decompressed in the indoor expansion valve 8, flows into the heat absorber 9 to evaporate, absorbs heat from the air passed through the air flow passage 3, flows through the evaporation capability control valve 11, the internal heat exchanger 19 and the refrigerant pipe 13C to reach the accumulator 12, and flows therethrough to be sucked into the compressor 2, thereby repeating this circulation.

Figure 4:
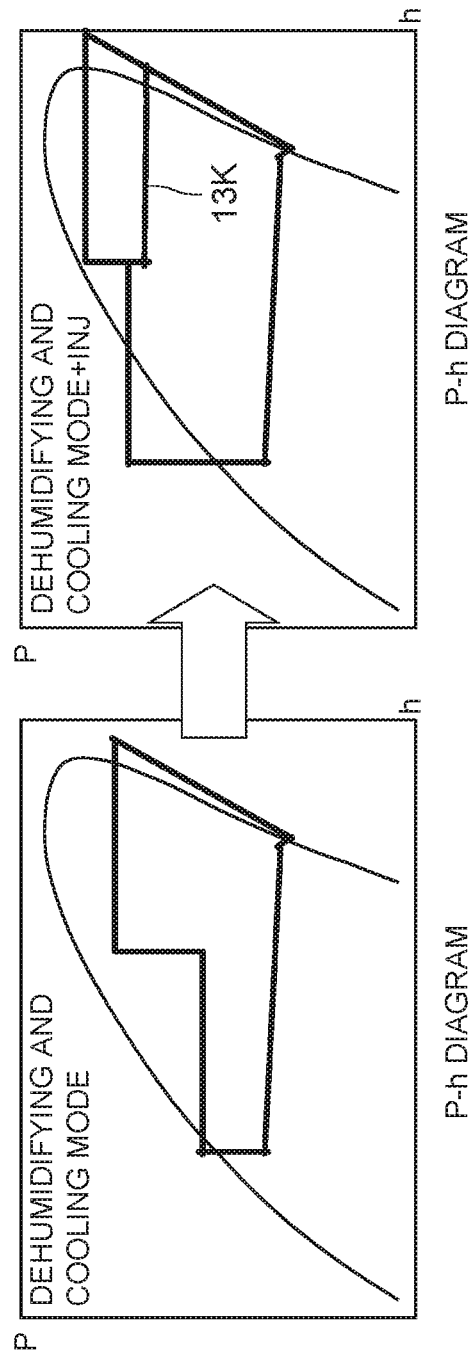
FIG. 4 is a P-h diagram of the air conditioning device for vehicle of FIG. 1 in a first dehumidifying and cooling type defrosting mode.

Additionally, when the controller 32 executes the first dehumidifying and cooling type defrosting mode as described later, the controller opens the injection expansion valve 30 of the injection circuit 40, and distributes a part of the refrigerant flowing out from the radiator 4 to perform the gas injection in the middle of the compression by the compressor 2 as described above. FIG. 4 shows a P-h diagram in a case where the gas injection is performed in the first dehumidifying and cooling type defrosting mode, and a left side shows that the gas injection is not performed (the dehumidifying and cooling mode) and a right side shows that the gas injection is performed, respectively. A part denoted with 13K in the drawing shows the refrigerant subjected to the gas injection. As apparent from this drawing, in the case that the injection circuit 40 performs the gas injection (the right side), the heating capability by the radiator 4 and the defrosting capability of the outdoor heat exchanger 7 are improved (an upper side of the P-h diagram) as compared with the case that the gas injection is not performed (the left side). On the other hand, it is seen that a cooling operation (a lower side of the P-h diagram) does not much change.

(8-3) Flow of Refrigerant of Second Dehumidifying and Cooling Type Defrosting Mode It is to be noted that flow of the refrigerant of the second dehumidifying and cooling type defrosting mode is the same as that of the abovementioned dehumidifying and cooling mode (however, in the second dehumidifying and cooling type defrosting mode, the gas injection is not performed as described later), and hence the description is omitted.

Figure 5:
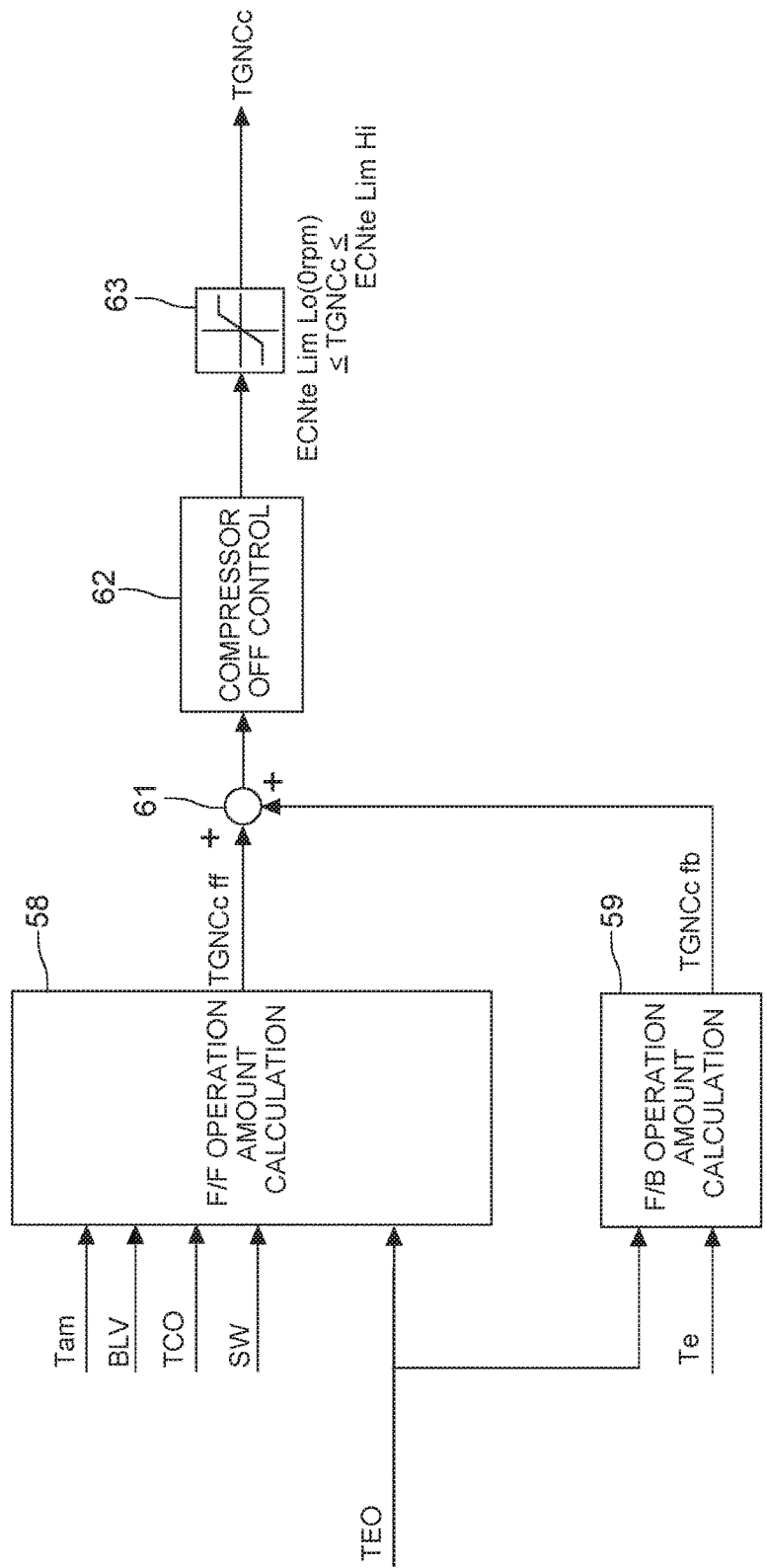
FIG. 5 is a control block diagram concerning compressor control in the reverse cycle defrosting mode and the first dehumidifying and cooling type defrosting mode by the controller of FIG. 2.

(8-4) Control of Compressor in Reverse Cycle Defrosting Mode and First Dehumidifying and Cooling Type Defrosting Mode On the other hand, FIG. 5 is a control block diagram of the controller 32 which determines a target number of revolution (a compressor target number of revolution) TGNCc of the compressor 2 for the reverse cycle defrosting mode and the first dehumidifying and cooling type defrosting mode. An F/F (feedforward) control amount calculation section 58 of the controller 32 calculates an F/F control amount TGNCcff of the compressor target number of revolution on the basis of the outdoor air temperature Tam, a blower voltage BLV, a target radiator temperature TCO which is a target value of a temperature of the radiator 4, an air mix damper opening SW of the air mix damper 28 which is obtained by SW =(TAO-Te)/(TH-Te), and the target heat absorber temperature TEO which is the target value of the temperature of the heat absorber 9.

Additionally, an F/B (feedback) control amount calculation section 59 calculates an F/B control amount TGNCcfb of the compressor target number of revolution on the basis of the target heat absorber temperature TEO and the heat absorber temperature Te. Further, the F/F control amount TGNCcff calculated by the F/F control amount calculation section 58 and the F/B control amount TGNCcfb calculated by the F/B control amount calculation section 59 are added by an adder 61, and transmitted through a compressor OFF control section 62 (to define a minimum number of revolution at which the compressor 2 is operable) to a limit setting section 63 which attaches limits of an upper limit value of controlling and a lower limit value of controlling, and then the compressor target number of revolution TGNCc is determined. In the reverse cycle defrosting mode and the first dehumidifying and cooling type defrosting mode, the controller 32 controls the number of revolution of the compressor 2 on the basis of the compressor target number of revolution TGNCc.

Figure 6:
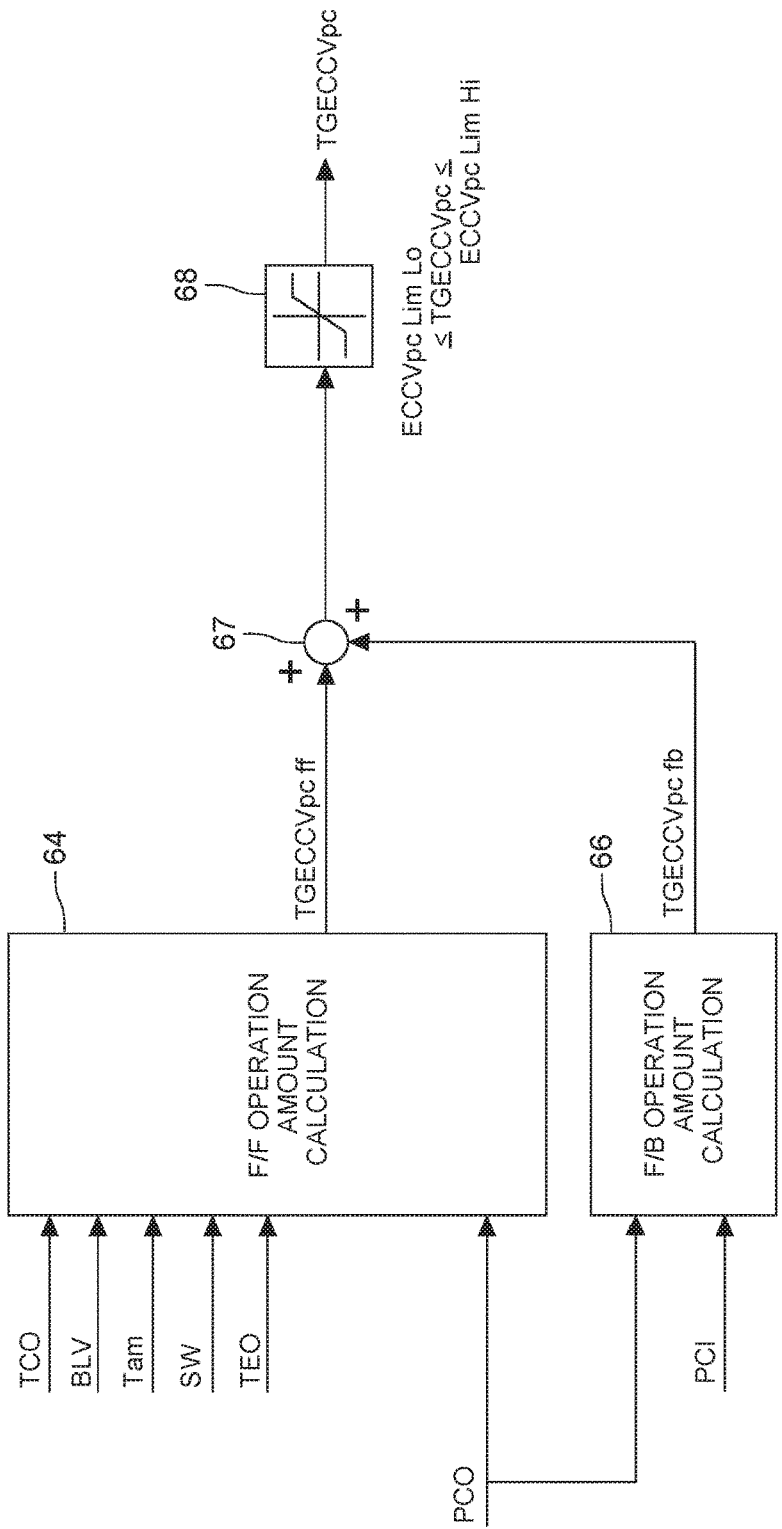
FIG. 6 is a control block diagram concerning outdoor expansion valve control in the reverse cycle defrosting mode and the first dehumidifying and cooling type defrosting mode by the controller of FIG. 2.

(8-5) Control of Outdoor Expansion Valve in Reverse Cycle Defrosting Mode and First Dehumidifying and Cooling Type Defrosting Mode Next, FIG. 6 is a control block diagram of the controller 32 which determines a target position (an outdoor expansion valve target position) TGECCVpc of the outdoor expansion valve 6 in the reverse cycle defrosting mode and the first dehumidifying and cooling type defrosting mode. An F/F control amount calculation section 64 of the controller 32 calculates an F/F control amount TGECCVpcff of the outdoor expansion valve target position on the basis of the target radiator temperature TCO, the blower voltage BLV, the outdoor air temperature Tam, the air mix damper opening SW, the target heat absorber temperature TEO, and the target radiator pressure PCO.

In addition, an F/B control amount calculation section 66 calculates an F/B control amount TGECCVpcfb of the outdoor expansion valve target position on the basis of the target radiator pressure PCO and the radiator pressure PCI. Further, the F/F control amount TGECCVpcff calculated by the F/F control amount calculation section 64 and the F/B control amount TGECCVpcfb calculated by the F/B control amount calculation section 66 are added by an adder 67, limits of an upper limit value of controlling and a lower limit value of controlling are attached by a limit setting section 68, and then the outdoor expansion valve target position TGECCVpc is determined. In the reverse cycle defrosting mode and the first dehumidifying and cooling type defrosting mode, the controller 32 controls the valve position of the outdoor expansion valve 6 on the basis of this outdoor expansion valve target position TGECCVpc.

(8-6) Control 1 of Injection Expansion Valve

Figure 7:
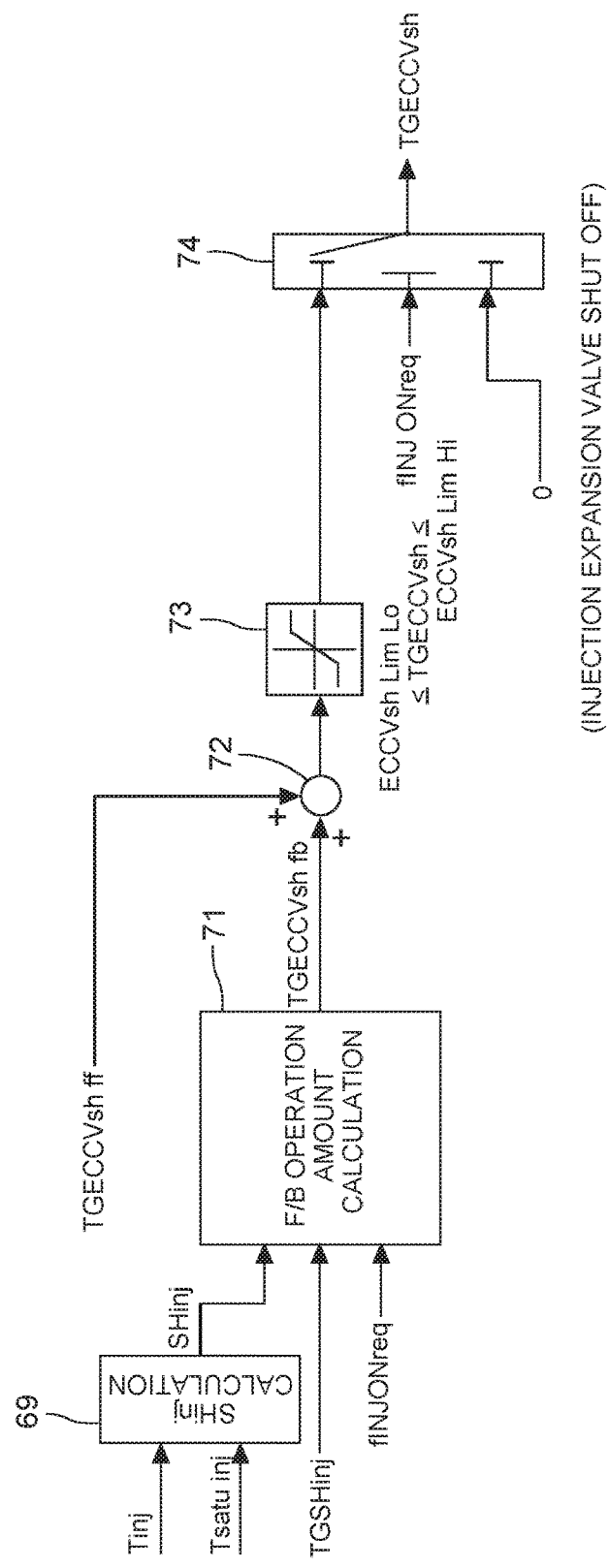
FIG. 7 is a control block diagram concerning injection expansion valve control in the reverse cycle defrosting mode, the first dehumidifying and cooling type defrosting mode and a hot gas defrosting mode by the controller of FIG. 2.

Next, FIG. 7 is a control block diagram of the controller 32 which determines a target position (an injection expansion valve target position) TGECCVsh of the injection expansion valve 30 of the injection circuit 40 in a case where a number of revolution NC of the compressor 2 is lower than a predetermined value N1 (the case of the low number of revolution). It is to be noted that in the embodiment, the gas injection is executed in the first dehumidifying and cooling type defrosting mode (including the abovementioned case where the gas injection is performed in the reverse cycle defrosting mode) and the hot gas defrosting mode as described later. An injection refrigerant superheat degree calculation section 69 of the controller 32 calculates a superheat degree (an injection refrigerant superheat degree) SHinj of the injection refrigerant to be returned from the injection circuit 40 to the middle of the compression by the compressor 2, on the basis of a difference between a temperature (an injection refrigerant temperature Tinj) of the injection refrigerant which is detected by the injection temperature sensor 55 and a saturation temperature Tsatuinj.

Next, an F/B control amount calculation section 71 calculates an F/B control amount TGECCVshfb of the injection expansion valve target position on the basis of the injection refrigerant superheat degree SHinj calculated by the injection refrigerant superheat degree calculation section 69, and a target value (a target injection refrigerant superheat degree TGSHinj) of the superheat degree of the injection refrigerant to be returned from the injection circuit 40 to the middle of the compression by the compressor 2. Additionally, the F/B control amount calculation section 71 operates when a predetermined injection required flag fINJONreq is "1" (set), and stops the calculation when the flag is "0" (reset).

Further, the F/B control amount TGECCVshfb calculated by the F/B control amount calculation section 71 and an F/F control amount TGECCVshff of the injection expansion valve 30 which is beforehand determined are added by an adder 72, limits of a controlling upper limit value and a controlling lower limit value are attached by a limit setting section 73, and then the control amount is input into an injection feasibility changing section 74. Into the injection feasibility changing section 74, "0" (the injection expansion valve 30 is shut off) is further input, and when the injection required flag fINJONreq is "1" (set), the value through the limit setting section 73 is determined as the injection expansion valve target position TGECCVsh and output.

It is to be noted that the injection feasibility changing section 74 outputs "0" as the injection expansion valve target position TGECCVsh, when the injection required flag fIN-JONreq is "0" (reset). That is, in the case where the number of revolution NC of the compressor 2 is a low number of revolution lower than the predetermined value N1, when the injection required flag fINJONreq is set to "1", the controller 32 determines the injection expansion valve target position TGECCVsh of the injection expansion valve 30 on the basis of the superheat degree SHinj of the injection refrigerant and the target injection refrigerant superheat degree TGSHinj, and controls the valve position, and when the injection required flag fINJONreq is reset to "0", the controller closes the injection expansion valve 30 (the valve position is "0" and the valve is shut off), and stops the gas injection by the injection circuit 40.

(8-7) Control 2 of Injection Expansion Valve

Figure 8:
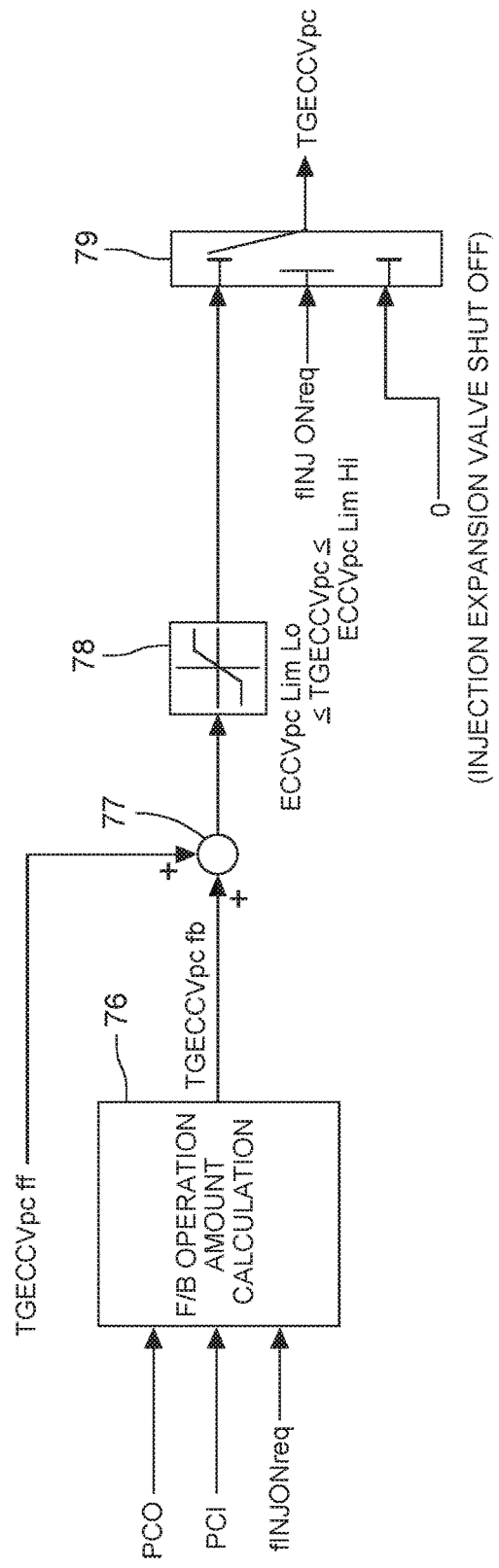
FIG. 8 is another control block diagram concerning the injection expansion valve control in the reverse cycle defrosting mode, the first dehumidifying and cooling type defrosting mode and the hot gas defrosting mode by the controller of FIG. 2.

Next, FIG. 8 is a control block diagram of the controller 32 which determines a target position (an injection expansion valve target position) TGECCVpc of the injection expansion valve 30 of the injection circuit 40 in a case where the number of revolution NC of the compressor 2 is the predetermined value N1 or more (the case of a high number of revolution). It is to be noted that the gas injection of this case is also executed in the first dehumidifying and cooling type defrosting mode (including the abovementioned case where the gas injection is performed in the reverse cycle defrosting mode) and the hot gas defrosting mode.

An F/B control amount calculation section 76 of this case calculates an F/B control amount TGECCVpcfb of the injection expansion valve target position on the basis of the target radiator pressure PCO and the radiator pressure PCI. Additionally, the F/B control amount calculation section 76 operates when the injection required flag fINJONreq is "1" (set), and stops the calculation when the flag is "0" (reset). Further, the F/B control amount TGECCVpcfb calculated by the F/B control amount calculation section 76 and an F/F control amount TGECCVpcff of this case of the injection expansion valve 30 which is beforehand determined are added by an adder 77, limits of a controlling upper limit value and a controlling lower limit value are attached by a limit setting section 78, and then the control amount is input into an injection feasibility changing section 79. Into the injection feasibility changing section 79, "0" (the injection expansion valve 30 is shut off) is further input, and when the injection required flag fINJONreq is "1" (set), the value through the limit setting section 78 is determined as the injection expansion valve target position TGECCVpc of this case and output.

It is to be noted that the injection feasibility changing section 79 outputs "0" as the injection expansion valve target position TGECCVpc, when the injection required flag fIN-JONreq is "0" (reset). That is, in the case where the number of revolution NC of the compressor 2 is a high number of revolution of the predetermined value N1 or more, when the injection required flag fINJONreq is set to "1", the controller 32 determines the injection expansion valve target position TGECCVpc of the injection expansion valve 30 on the basis of the target radiator pressure PCO and the radiator pressure PCI, and controls the valve position, and when the injection required flag fINJONreq is reset to "0", the controller closes the injection expansion valve 30 (the valve position is "0" and the valve is shut off), and stops the gas injection by the injection circuit 40.

Figure 9:
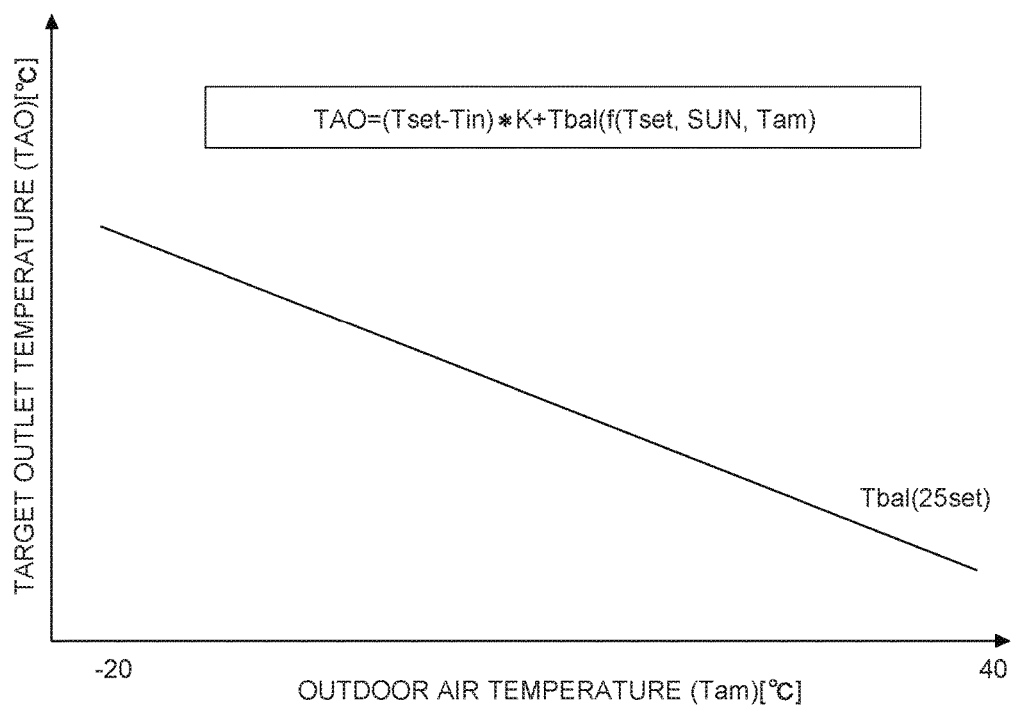
FIG. 9 is a diagram to explain determination of a target outlet temperature by the controller of FIG. 2.

Additionally, the target outlet temperature TAO is a target value of the temperature of the air to be blown out from the outlet 29 to the vehicle interior, and calculated from Equation (I) mentioned below by the controller 32.

$$TAO = (Tset - Tin) \times K + Tbal(f(Tset, SUN, Tam)) \quad (I),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes as shown in FIG. 9. In addition, the controller 32 calculates the target radiator temperature TCO from the target outlet temperature TAO.

(8-8) Control of Defrosting Mode (Embodiment 1)

Next, control of the defrosting mode by the controller 32 in the heating mode will specifically be described with reference to a flowchart of FIG. 10. The controller 32 reads data from each sensor in step S1 of FIG. 10 and judges in step S2 whether or not there is a defrosting required for the outdoor heat exchanger 7.

Here, a detection example of a frosting condition of the outdoor heat exchanger 7 will be described. In the embodiment, the controller 32 detects the frosting condition of the outdoor heat exchanger 7 on the basis of an outdoor heat exchanger temperature (e.g., a refrigerant evaporation temperature of an outlet of the outdoor heat exchanger 7) TXO of the outdoor heat exchanger 7 which can be obtained from the outdoor heat exchanger temperature sensor 54 and an outdoor heat exchanger temperature (similarly, a refrigerant evaporation temperature of the outlet of the outdoor heat exchanger 7) TXObase of the outdoor heat exchanger 7 in non-frosting when the outdoor air has a low humidity environment and the outdoor heat exchanger 7 is not frosted. In this case, the controller 32 determines the outdoor heat exchanger temperature TXObase in non-frosting by use of Equation (II) mentioned below.

$$TXObase = f(Tam, NC, BLV, VSP) = k1 \times Tam + k2 \times NC + k3 \times BLV + k4 \times VSP \quad (II)$$

Here, Tam which is a parameter of Equation (II) is the outdoor air temperature which can be obtained from the outdoor air temperature sensor 33, NC is the number of revolution of the compressor 2, BLV is the blower voltage of the indoor blower 27, VSP is a vehicle speed which can be obtained from the velocity sensor 52, and k1 to k4 are coefficients which are beforehand obtained by experiments.

The outdoor air temperature Tam is an index indicating a suction air temperature of the outdoor heat exchanger 7, and when the outdoor air temperature Tam (the suction air temperature of the outdoor heat exchanger 7) becomes lower, TXObase tends to be lower. Therefore, the coefficient k1 is a positive value. It is to be noted that the index indicating the suction air temperature of the outdoor heat exchanger 7 is not limited to the outdoor air temperature Tam.

Additionally, the number of revolution NC of the compressor 2 is an index indicating a refrigerant flow rate in the refrigerant circuit R, and when the number of revolution NC is higher (the refrigerant flow rate is larger), TXObase tends to be lower. Therefore, the coefficient k2 is a negative value.

Additionally, the blower voltage BLV is an index indicating the volume of the air to be passed through the radiator 4, and when the blower voltage BLV is higher (the volume of the air to be passed through the radiator 4 is larger), TXObase tends to be lower. Therefore, the coefficient k3 is a negative value. It is to be noted that the index indicating the volume of the air to be passed through the radiator 4 is not limited to this index, and may be a blower air volume of the indoor blower 27 or the opening SW of the air mix damper 28.

Additionally, the vehicle speed VSP is an index indicating the velocity of the air to be passed through the outdoor heat exchanger 7, and when the vehicle speed VSP is lower (the velocity of the air to be passed through the outdoor heat exchanger 7 is lower), TXObase tends to be lower. Therefore, the coefficient k4 is a positive value. It is to be noted that the index indicating the velocity of the air to be passed through the outdoor heat exchanger 7 is not limited to this example, and may be a voltage of the outdoor blower 15.

It is to be noted that in the embodiment, as the parameters of Equation (II), the outdoor air temperature Tam, the number of revolution NC of the compressor 2, the blower voltage BLV of the indoor blower 27 and the vehicle speed VSP are used, but a load of the air conditioning device for vehicle 1 may be added as another parameter to these parameters. It is considered that indexes indicating this load are the target outlet temperature TAO, the number of revolution NC of the compressor 2, the blower air volume of the indoor blower 27, an inlet air temperature of the radiator 4 and a radiator temperature Tci of the radiator 4, and when the load is larger, TXObase tends to be lower. Furthermore, aging deterioration (the number of years of operation or the number of times of operation) of the vehicle may be added to the parameters. Additionally, the parameters of Equation (II) are not limited to all of the above parameters, and one of the parameters or any combination thereof may be used.

Next, the controller 32 calculates a difference ΔTXO (ΔTXO=TXObase−TXO) between the outdoor heat exchanger temperature TXObase in non-frosting which can be obtained by substituting a current value of each parameter into Equation (II) and the current outdoor heat exchanger temperature TXO, and the controller judges that the outdoor heat exchanger 7 is frosted, when there continues, for predetermined time or more, a state where the outdoor heat exchanger temperature TXO is lower than the outdoor heat exchanger temperature TXObase in non-frosting and the difference ΔTXO is a predetermined frosting detection threshold value or more.

Figure 11:
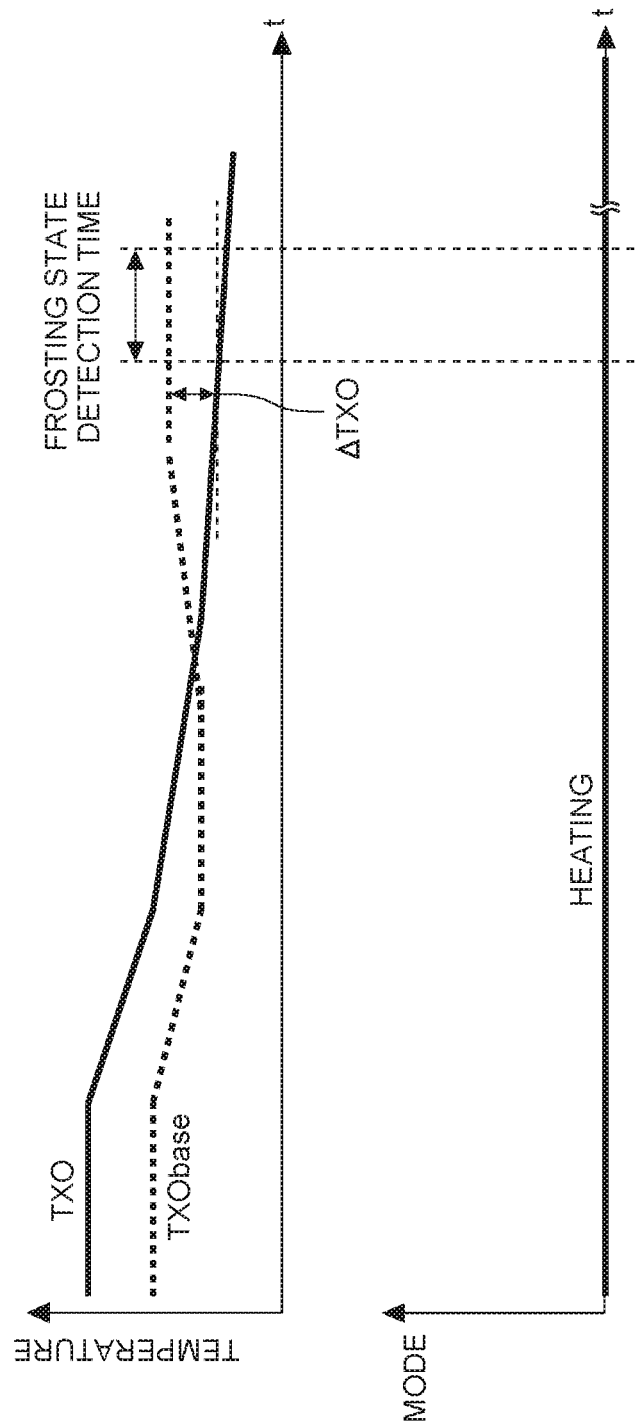
FIG. 11 is a diagram to explain one example of frosting detection of the outdoor heat exchanger by the controller of FIG. 2.

In FIG. 11, a solid line shows a change of the outdoor heat exchanger temperature TXO and a broken line shows a change of the outdoor heat exchanger temperature TXObase in non-frosting. In the beginning of an operation start, the outdoor heat exchanger temperature TXO is high and is in excess of the outdoor heat exchanger temperature TXObase in non-frosting. The vehicle interior temperature is raised accompanying progress of the heating mode, and the load of the air conditioning device for vehicle 1 lowers, and hence the abovementioned refrigerant flow rate or the passing air volume of the radiator 4 also lowers, and TXObase (the broken line of FIG. 11) calculated in accordance with Equation (II) rises. On the other hand, when the outdoor heat exchanger 7 is frosted, a heat exchange performance with the outdoor air worsens, so that the outdoor heat exchanger temperature TXO (the solid line) drops and then falls below TXObase. Then, the drop of the outdoor heat exchanger temperature TXO further proceeds, and the difference ΔTXO (TXObase−TXO) reaches a frosting detection threshold value or more. Furthermore, when this state is continued for the predetermined time or more, the controller 32 judges that the outdoor heat exchanger 7 is frosted and that the defrosting is required, to issue a defrosting required.

It is to be noted that in the embodiment, the outdoor heat exchanger temperature TXO is employed to detect the frosting condition, but the present invention is not limited to this embodiment, and the frosting condition of the outdoor heat exchanger 7 may be detected on the basis of a current refrigerant evaporation pressure (an outdoor heat exchanger pressure) PXO of the outdoor heat exchanger 7 which can be obtained from the outdoor heat exchanger pressure sensor 56, and an outdoor heat exchanger pressure PXObase in non-frosting when the outdoor air is the low humidity environment and the outdoor heat exchanger 7 is not frosted.

Additionally, means for detecting the frosting condition of the outdoor heat exchanger 7 is not limited to the above example, and the controller 32 may detect (estimate) the frosting condition of the outdoor heat exchanger 7 on the basis of a dew-point temperature and the refrigerant evaporation temperature of the outdoor heat exchanger 7 (the outdoor heat exchanger temperature) which are detected by the outdoor air temperature sensor 33 and the outdoor air humidity sensor 34.

In a case where the controller 32 judges in the step S2 that there is the defrosting required, the controller advances from the step S2 to step S3 to judge whether or not the current outdoor air temperature Tam detected by the outdoor air temperature sensor 33 is lower than a predetermined value T2. The predetermined value T2 is a predetermined temperature value by which it is possible to judge an environment in which the outdoor air temperature Tam is low or high. Further, in a case where the environment in which the outdoor air temperature Tam is lower than T2 is judged in the step S3, the controller 32 advances to step S4 to judge whether or not the passenger is in the vehicle interior at present, on the basis of an output of the passenger sensor 57.

In a case where it is judged in the step S4 that the passenger is in the vehicle, the controller 32 advances to step S5 to judge whether or not there is a heating required. In a case where the current air conditioning operation mode is the heating mode (or the dehumidifying and heating mode) and it is necessary to heat the vehicle interior, the controller 32 judges that there is the heating required and advances to step S6 to define the target radiator pressure (the target high pressure) PCO as a predetermined value P1 (the high pressure).

Next, the controller advances to the step S7 to execute the abovementioned first dehumidifying and cooling type defrosting mode. That is, the refrigerant radiates heat in the radiator 4 and the outdoor heat exchanger 7 and absorbs heat in the heat absorber 9. In consequence, the outdoor heat exchanger 7 is defrosted. Additionally, as in the abovementioned control block of FIG. 6, the F/B control of the outdoor expansion valve 6 is executed on the basis of the target radiator pressure PCO and the air mix damper 28 is adjusted into the above MH. Additionally, the indoor blower 27 is coordinated and controlled at an outlet temperature, passenger's discomfort is avoided, and additionally, the suction changing damper 26 is adjusted into an indoor air circulating mode.

Additionally, in step S8, the controller 32 executes F/B control of the compressor 2 on the basis of the target heat absorber temperature TEO as in the abovementioned control block of FIG. 5 (in the same manner as in the cooling or dehumidifying and cooling mode). Additionally, the injection circuit 40 is operated and the gas injection is performed in the middle of the compression by the compressor 2. In this case, as in the control blocks of FIG. 7 and FIG. 8, the controller 32 executes the F/B control of the valve position of the injection expansion valve 30 on the basis of the injection superheat degree SHinj as in FIG. 7, when the number of revolution NC of the compressor 2 is a low number of revolution of the predetermined value N1 or less, thereby controlling the gas injection amount. Additionally, when the number of revolution NC of the compressor 2 is a high number of revolution higher than the predetermined value N1, the controller executes the F/B control of the valve position of the injection expansion valve 30 on the basis of the target radiator pressure PCO as in FIG. 8, thereby controlling the gas injection amount. Additionally, the injection superheat degree SHinj is adjusted to be higher than 10 degrees to prevent liquid back to the compressor 2.

Next, the controller 32 advances to step S9, operates (ON) the outdoor blower 15 when the outdoor heat exchanger temperature TXO is a predetermined value TX1 (e.g., +25° C.) or more, and forcibly passes the outdoor air through the outdoor heat exchanger 7. On the other hand, when the outdoor heat exchanger temperature TXO is lower than a predetermined value TX2 (e.g., +20° C. which has a predetermined hysteresis to TX1), the controller stops (OFF) the outdoor blower 15.

On the other hand, in a case where it is judged in the step S5 that there is not the heating required, the controller 32 advances to step S10 to define the target radiator pressure PCO as a predetermined value P2 (a medium pressure, P1≤P2), and next advances to the step S11 to execute the abovementioned first dehumidifying and cooling type defrosting mode. However, in this case, differently from the step S7, the indoor blower 27 is rotated at a predetermined voltage V1. Subsequently, the step S8 and the step S9 are successively executed.

Additionally, in a case where it is judged in the step S4 that the passenger is not in the vehicle (the vehicle is stopped for plug-in or the like), the controller 32 advances from the step S4 to step S12 to define the target radiator pressure PCO as P2 (the medium pressure), and next advances to step S13 to judge whether or not the vehicle interior temperature is lower than the predetermined value T1 (e.g., +5° C.). Immediately after the passenger gets out of the vehicle, the vehicle interior temperature is comparatively high and is the predetermined value T1 or more, and in this case, the controller 32 advances from the step S13 to step S14 to execute the abovementioned reverse cycle defrosting mode.

That is, the refrigerant radiates heat only in the outdoor heat exchanger 7 and absorbs heat in the heat absorber 9. Consequently, the outdoor heat exchanger 7 is strongly defrosted. Additionally, the outdoor expansion valve 6 is fully opened and the air mix damper 28 is adjusted into the above MC. In addition, the indoor blower 27 is operated at a predetermined voltage V2 (V2<V1). Additionally, the controller 32 advances to the step S15 to execute the F/B control of the compressor 2 on the basis of the target heat absorber temperature TEO as in the abovementioned control block of FIG. 5 (in the same manner as in the cooling or dehumidifying and cooling mode). However, the injection circuit 40 is not operated (OFF) and the gas injection to the compressor 2 is not performed.

In consequence, the high-temperature refrigerant is concentrated on the defrosting of the outdoor heat exchanger 7. At this time, the heat absorption is performed in the heat absorber 9, but the passenger is not in the vehicle interior, and hence even when the vehicle interior temperature lowers, there is not any special hindrance. Additionally, in a case where the vehicle interior temperature is lower than the predetermined value T1, the controller 32 advances from the step S13 to the step S11, the step S8 and the step S9, switches to the abovementioned first dehumidifying and cooling type defrosting mode (adjusts the air mix damper 28 into the above MH), controls the compressor 2, the injection expansion valve 30 and the like so that the temperature of the outdoor heat exchanger 7 approximately reaches a predetermined value (+25° C. to +30° C.), and restarts the heating by the heat radiation in the radiator 4 by the gas injection while defrosting the outdoor heat exchanger 7 to raise the vehicle interior temperature.

Additionally, in a case where the environment in which the outdoor air temperature Tam is high and is the predetermined value T2 or more is judged in the step S3, the controller 32 advances from the step S3 to step S16, defines the target radiator pressure PCO as a predetermined value P3 (a low pressure, P1≥P2≥P3), and advances to step S17 to execute the abovementioned second dehumidifying and cooling type defrosting mode. That is, the refrigerant radiates heat in the radiator 4 and the outdoor heat exchanger 7 and absorbs heat in the heat absorber 9. Consequently, the outdoor heat exchanger 7 is defrosted. Additionally, the F/B control of the outdoor expansion valve 6 is executed on the basis of the target radiator pressure PCO as in the abovementioned control block of FIG. 6 and the air mix damper 28 is adjusted into the above MH. Additionally, the indoor blower 27 is operated at a predetermined voltage V3 (V1<V3) and the suction changing damper 26 is adjusted into the indoor air circulating mode.

Further, the controller 32 advances to the step S15 to execute the F/B control of the compressor 2 on the basis of the target heat absorber temperature TEO as in the abovementioned control block of FIG. 5 (in the same manner as in the cooling or dehumidifying and cooling mode). Additionally, the injection circuit 40 is not operated (OFF) and the gas injection to the compressor 2 is not performed. Consequently, more high-temperature refrigerant flows through the outdoor heat exchanger 7. At this time, the injection circuit 40 does not operate, but the outdoor air temperature Tam is high in the environment, and hence any hindrance is not generated in the vehicle interior temperature.

As described above, when the controller 32 passes the high-temperature refrigerant through the outdoor heat exchanger 7 to perform the defrosting, the controller operates the injection circuit 40 to return the refrigerant to the middle of the compression by the compressor 2. Additionally, in the case where there is the heating required for the vehicle interior, in the step S7, the controller executes the first dehumidifying and cooling type defrosting mode in which the refrigerant discharged from the compressor 2 radiates heat in the radiator 4 and the outdoor heat exchanger 7 and the refrigerant by which heat has been radiated is decompressed and then absorbs heat in the heat absorber 9, and in the step S8, the controller operates the injection circuit 40. Therefore, the injection circuit 40 can return a part of the refrigerant flowing out from the radiator 4 to the middle of the compression by the compressor 2, improve the heating capability by the radiator 4 and achieve maintaining of the vehicle interior temperature.

Additionally, the defrosting of the outdoor heat exchanger 7 can be executed without hindrance, and hence increase of power consumption due to lengthening of the defrosting can be avoided effectively especially in the electric car or the hybrid car.

In this case, when the controller 32 defrosts the outdoor heat exchanger 7 in the step S9, the controller operates the outdoor blower 15 which passes the outdoor air through the outdoor heat exchanger 7 in a case where the outdoor heat exchanger temperature TXO of the outdoor heat exchanger 7 is the predetermined value TX1 or more, and the controller stops the outdoor blower in a case where the outdoor heat exchanger temperature is lower than the predetermined value TX2. In consequence, it is possible to prevent or inhibit the disadvantage that steam generated by the defrosting adheres to the outdoor heat exchanger 7 again.

Additionally, in a case where the outdoor air temperature Tam is the predetermined value T2 or more, the controller 32 executes the second dehumidifying and cooling type defrosting mode in the step S17, whereby under an environment where the outdoor air temperature Tam is high and the heating capability in the vehicle interior is easy to be maintained, more refrigerant can be supplied to the outdoor heat exchanger 7 without operating the injection circuit 40, and the defrosting can be promoted.

In addition, the controller 32 executes the abovementioned reverse cycle defrosting mode in the step S14 until the vehicle interior temperature becomes lower than the predetermined value T1, and in a case where the vehicle interior temperature is lower than the predetermined value T1, the controller executes the abovementioned first dehumidifying and cooling type defrosting mode in the step S11 in which the refrigerant also radiates heat in the radiator 4. Consequently, it is possible to achieve the control which satisfies both of rapid defrosting of the outdoor heat exchanger 7 and the maintaining of the heating of the vehicle interior.

Additionally, the controller 32 adjusts the suction changing damper 26 into the indoor air circulating mode and stops introduction of the outdoor air into the air flow passage 3 in the first dehumidifying and cooling type defrosting mode of the step S11 or step S7, in a case where the vehicle interior temperature is lower than the predetermined value T1 or a case where it is necessary to heat the vehicle interior, when the controller defrosts the outdoor heat exchanger 7. Consequently, in a situation where the vehicle interior temperature is low, the introduction of the outdoor air having a low temperature can be stopped, and the maintaining of the heating capability can be achieved. Additionally, also when the second dehumidifying and cooling type defrosting mode of the step S17 is executed, the suction changing damper 26 is adjusted into the indoor air circulating mode and the introduction of the outdoor air into the air flow passage 3 is stopped, so that it is similarly possible to achieve the maintaining of the heating capability.

Embodiment 2

(9) Defrosting Mode (Embodiment 2)

Figure 12:
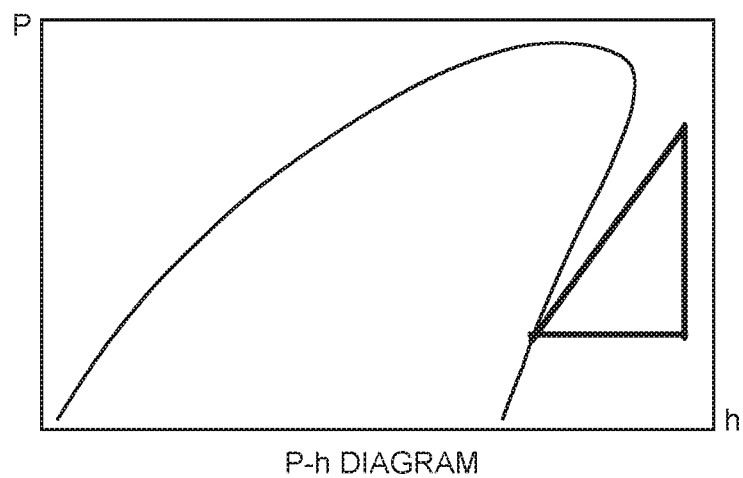
FIG. 12 is a P-h diagram in a simple hot gas defrosting mode of the air conditioning device for vehicle of FIG. 1 which is to be executed in another embodiment of the present invention.

Next, another embodiment of the air conditioning device for vehicle 1 of the present invention will be described with reference to FIG. 12 to FIG. 14. In the case of this embodiment, a controller 32 has a simple hot gas defrosting mode as a defrosting mode in addition to the abovementioned first dehumidifying and cooling type defrosting mode and second dehumidifying and cooling type defrosting mode, and switches and executes these modes in accordance with a situation.

(9-1) Flow of Refrigerant of Simple Hot Gas Defrosting Mode

First, flow of a refrigerant of a simple hot gas defrosting mode in this case will be described. In this simple hot gas defrosting mode, the controller 32 opens a solenoid valve 21 and closes a solenoid valve 17, a solenoid valve 20 and a solenoid valve 22. Additionally, an outdoor expansion valve 6 is fully opened. Further, a compressor 2 and an outdoor blower 15 are operated, an indoor blower 27 is stopped, and an air mix damper 28 is adjusted into a state where air is not passed through a radiator 4 (MC).

In consequence, a high-temperature high-pressure gas refrigerant discharged from the compressor 2 flows into the radiator 4 through a discharge side heat exchanger 35, but the air in an air flow passage 3 is not passed through the radiator 4, the refrigerant therefore only passes here, and the refrigerant flowing out from the radiator 4 flows through a refrigerant pipe 13E to reach the outdoor expansion valve 6. At this time, the outdoor expansion valve 6 is fully opened, and hence the refrigerant passes the outdoor expansion valve 6 and a refrigerant pipe 13I, flows into an outdoor heat exchanger 7 as it is to radiate heat, and condenses to liquefy. The heat radiated at this time melts frost adhered to the outdoor heat exchanger 7.

The refrigerant flowing out from the outdoor heat exchanger 7 flows through a refrigerant pipe 13A to enter a refrigerant pipe 13D and flows into a refrigerant pipe 13C on a downstream side of an internal heat exchanger 19 through the solenoid valve 21. Further, the refrigerant flows through an accumulator 12 to be sucked into the compressor 2. That is, in this simple hot gas defrosting mode, the refrigerant does not flow through a heat absorber 9. It is to be noted that when the simple hot gas defrosting mode is executed as described later, the controller 32 does not operate an injection circuit 40, and all the refrigerant flowing out from the radiator 4 is used in defrosting of the outdoor heat exchanger 7. FIG. 12 shows a P-h diagram in this simple hot gas defrosting mode, and this case is shown in the form of a triangle as in this drawing.

(9-2) Control of Compressor in Simple Hot Gas Defrosting Mode (including a hot gas defrosting mode)

Figure 13:
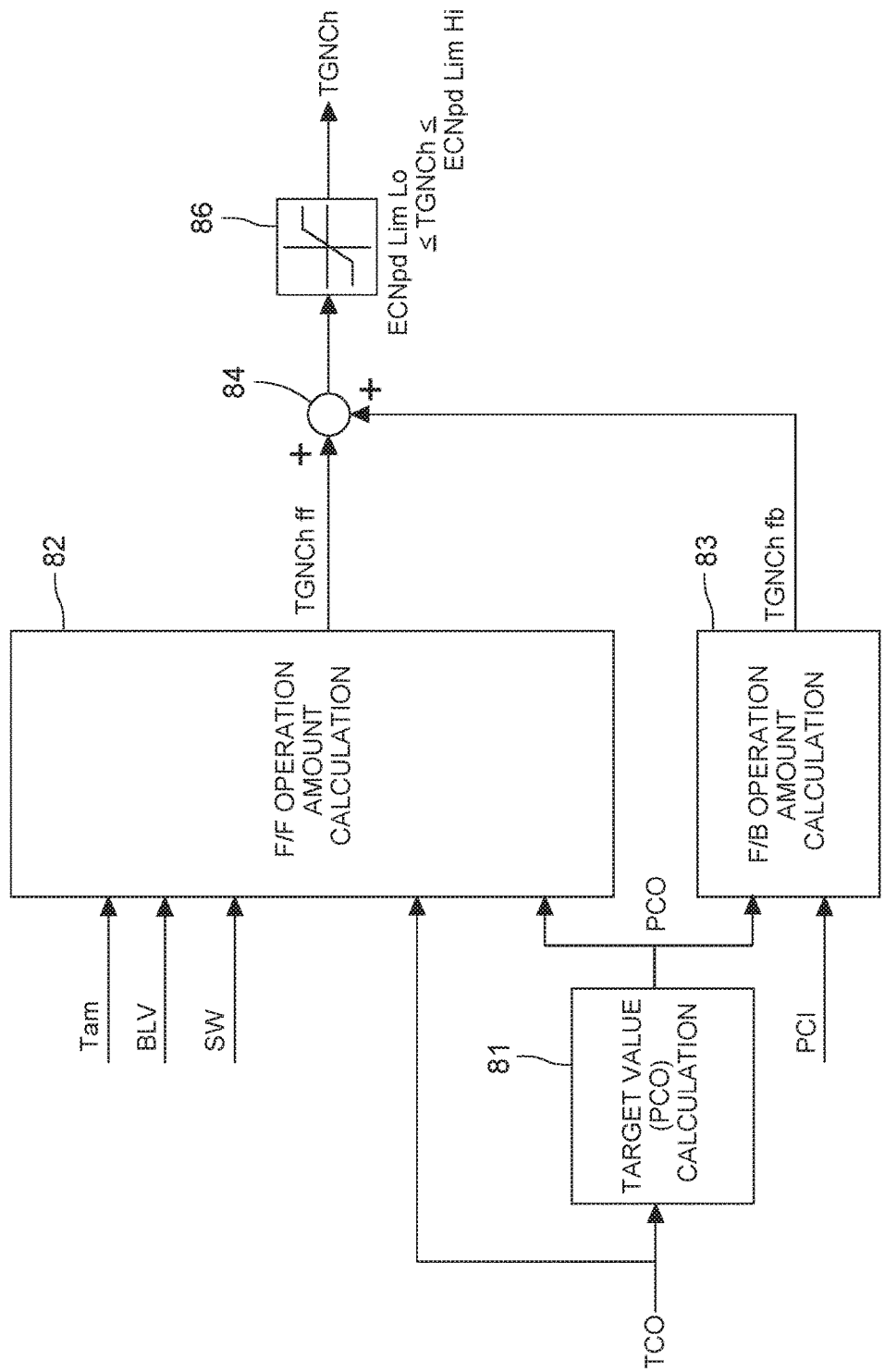
FIG. 13 is a control block diagram concerning compressor control in the simple hot gas defrosting mode and the hot gas defrosting mode by the controller of FIG. 2.

Next, FIG. 13 is a control block diagram of the controller 32 which determines a target number of revolution (a compressor target number of revolution) TGNCh of the compressor 2 for the above simple hot gas defrosting mode (including the hot gas defrosting mode which will be described later). An F/F control amount calculation section 82 of the controller 32 calculates an F/F control amount TGNChff of the compressor target number of revolution on the basis of an outdoor air temperature Tam obtained from an outdoor air temperature sensor 33, a blower voltage BLV of the indoor blower 27, an air mix damper opening SW of the air mix damper 28 mentioned above, a target radiator temperature TCO, and a target radiator pressure PCO.

The target radiator pressure PCO is calculated by the target value calculation section 81 on the basis of the target radiator temperature TCO. Furthermore, an F/B control amount calculation section 83 calculates an F/B control amount TGNChfb of the compressor target number of revolution on the basis of the target radiator pressure PCO and a radiator pressure PCI. Further, the F/F control amount TGNChff calculated by the F/F control amount calculation section 82 and the control amount TGNChfb calculated by the F/B control amount calculation section 83 are added by an adder 84, limits of a controlling upper limit value and a controlling lower limit value are attached by a limit setting section 86, and the control amount is determined as the compressor target number of revolution TGNCh. In the above simple hot gas defrosting mode and the after-mentioned hot gas defrosting mode, the controller 32 controls the number of revolution of the compressor 2 on the basis of the compressor target number of revolution TGNCh.

(9-3) Control of Defrosting Mode (Embodiment 2)

Next, control of the defrosting mode of this case by the controller 32 in a heating mode will specifically be described with reference to a flowchart of FIG. 14. The controller 32 reads data from each sensor in step S20 of FIG. 14 and judges in step S21 whether or not there is a defrosting required for the outdoor heat exchanger 7. It is to be noted that detection of a frosting condition of the outdoor heat exchanger 7 in this case is similar to the case of the step S2 of FIG. 10 mentioned above, and hence description is omitted.

In a case where the controller 32 judges in the step S21 that there is the defrosting required, the controller advances from the step S21 to step S22, and judges whether or not a car is plugged in at present. In an electric car or a hybrid car having a plug-in function, a battery can be charged from an external power source while the car is stopped, and also in this embodiment, the controller 32 has a function of operating the compressor 2 (the compressor 2 operates by power supply from the battery or power supply directly from the external power source). Further, during the plug-in, the controller advances from the step S22 to step S23.

It is to be noted that when the plug-in is not performed, the controller advances to step S31, and judges whether or not a remaining amount of the battery is lower than a predetermined value. This predetermined value is defined as a threshold value at which defrosting and heating can sufficiently be achieved by discharge of the battery. Further, also in a case where the battery remaining amount of a predetermined value or more is left, the controller advances to the step S23.

The controller 32 judges in the step S23 whether or not a current outdoor air temperature Tam detected by an outdoor air temperature sensor 33 is lower than the abovementioned predetermined value T2. Further, in a case where an environment in which the outdoor air temperature Tam is lower than T2 is judged in the step S23, the controller 32 advances to step S24, and judges whether or not a passenger is in a vehicle interior at present, on the basis of an output of a passenger sensor 57.

In a case where it is judged in the step S24 that the passenger is in a vehicle, the controller 32 advances to step S25 to judge whether or not there is the heating required. In the case where it is judged that there is the heating required as described above, the controller 32 advances to step S26, and defines a target radiator pressure (a target high pressure) PCO as the abovementioned predetermined value P1 (the high pressure).

Next, the controller advances to the step S27 and executes the abovementioned first dehumidifying and cooling type defrosting mode. That is, the refrigerant radiates heat in the radiator 4 and the outdoor heat exchanger 7 and absorbs heat in the heat absorber 9. In consequence, the outdoor heat exchanger 7 is defrosted. Additionally, as in the abovementioned control block of FIG. 6, F/B control of the outdoor expansion valve 6 is executed on the basis of the target radiator pressure PCO and the air mix damper 28 is adjusted into the above MH. Additionally, the indoor blower 27 is coordinated and controlled at an outlet temperature and a suction changing damper 26 is adjusted into an indoor air circulating mode.

Additionally, in step S28, the controller 32 executes F/B control of the compressor 2 on the basis of a target heat absorber temperature TEO as in the abovementioned control block of FIG. 5 (in the same manner as in a cooling or dehumidifying and cooling mode). Additionally, the injection circuit 40 is operated and gas injection is performed in the middle of compression by the compressor 2. In this case, as in the control blocks of FIG. 7 and FIG. 8, the controller 32 executes F/B control of a valve position of an injection expansion valve 30 on the basis of an injection superheat degree SHinj as in FIG. 7, when a number of revolution NC of the compressor 2 is a low number of revolution of a predetermined value N1 or less, thereby controlling a gas injection amount. Additionally, when the number of revolution NC of the compressor 2 is a high number of revolution higher than the predetermined value N1, the controller executes the F/B control of the valve position of the injection expansion valve 30 on the basis of the target radiator pressure PCO as in FIG. 8, thereby controlling the gas injection amount. Additionally, the injection superheat degree SHinj is adjusted to be higher than 10 degrees in the same manner as described above.

Next, the controller 32 advances to step S29, operates (ON) the outdoor blower 15 when an outdoor heat exchanger temperature TXO is a predetermined value TX1 (e.g., +25° C.) or more, and forcibly passes outdoor air through the outdoor heat exchanger 7 in the same manner as described above. On the other hand, when the outdoor heat exchanger temperature TXO is lower than a predetermined value TX2 (e.g., +20° C. which has a predetermined hysteresis to TX1), the controller stops (OFF) the outdoor blower 15.

On the other hand, in a case where there is not the heating required in the step S25, the controller 32 advances to step S30 to define the target radiator pressure PCO as the abovementioned predetermined value P2 (a medium pressure, P1≥P2), and next advances to step S33 to execute the abovementioned simple hot gas defrosting mode. That is, the refrigerant radiates heat only in the outdoor heat exchanger 7 and returns to the compressor 2 without flowing through the heat absorber 9. Consequently, the outdoor heat exchanger 7 is defrosted. Additionally, the outdoor expansion valve 6 is fully opened and the air mix damper 28 is adjusted into the above MC. Additionally, the indoor blower 27 stops.

Additionally, in step S34, the controller 32 executes the F/B control of the compressor 2 on the basis of the target radiator pressure PCO as in the abovementioned control block of FIG. 13 (in the same manner as in the heating mode). Additionally, the injection circuit 40 is not operated (OFF) and all the high-temperature refrigerant from the compressor 2 is used to perform the defrosting of the outdoor heat exchanger 7. Next, the controller 32 advances to the step S29 and controls an operation of the outdoor blower 15 in the same manner as described above.

Additionally, in a case where it is judged in the step S24 that the passenger is not in the vehicle and a case where it is judged in the step S31 that the battery remaining amount is lower than the predetermined value, the controller 32 advances to step S32 to define the target radiator pressure PCO as P2 (the medium pressure), and next advances to the step S33 to execute the above simple hot gas defrosting mode. That is, in the case where the passenger is not in the vehicle or the case where the battery remaining amount is small, the high-temperature refrigerant is concentrated on the defrosting of the outdoor heat exchanger 7.

Additionally, in a case where an environment in which the outdoor air temperature Tam is high and is the predetermined value T2 or more is judged in the step S23, the controller 32 advances from the step S23 to step S35, judges again whether or not the passenger is in the vehicle, and advances to the step S32 and the step S33 when the passenger is not in the vehicle. When the passenger is in the vehicle, the controller advances to step S36 to define the target radiator pressure PCO as the abovementioned predetermined value P3 (a low pressure, P1≥P2≥P3), and advances to step S37 to execute the abovementioned second dehumidifying and cooling type defrosting mode.

That is, when the plug-in is performed, the outdoor air temperature Tam is high and the passenger is in the vehicle, the refrigerant radiates heat in the radiator 4 and the outdoor heat exchanger 7 and absorbs heat in the heat absorber 9. Consequently, the outdoor heat exchanger 7 is defrosted. Additionally, the F/B control of the outdoor expansion valve 6 is executed on the basis of the target radiator pressure PCO as in the abovementioned control block of FIG. 6 and the air mix damper 28 is adjusted into the above MH. Additionally, the indoor blower 27 is operated at a predetermined voltage V3 and the suction changing damper 26 is adjusted into the indoor air circulating mode.

Further, the controller 32 advances to the step S37 to execute the F/B control of the compressor 2 on the basis of the target heat absorber temperature TEO as in the abovementioned control block of FIG. 5 (in the same manner as in the cooling or dehumidifying and cooling mode). Additionally, the injection circuit 40 is not operated (OFF) and the gas injection to the compressor 2 is not performed. Consequently, more high-temperature refrigerant flows through the outdoor heat exchanger 7. At this time, the injection circuit 40 does not operate, but the outdoor air temperature Tam is the high temperature, and hence any hindrance is not generated in the vehicle interior temperature.

As described above, in this embodiment, in a case where the outdoor air temperature Tam is the predetermined value T2 or more, in the step S37, the controller 32 executes the second dehumidifying and cooling type defrosting mode in which the refrigerant discharged from the compressor 2 radiates heat in the radiator 4 and the outdoor heat exchanger 7 and the refrigerant by which heat has been radiated is decompressed and then absorbs heat in the heat absorber 9, and in step S38, the controller does not operate the injection circuit 40. In consequence, under an environment where the outdoor air temperature Tam is high and a heating capability in the vehicle interior is easy to be maintained, more refrigerant can be supplied to the outdoor heat exchanger 7 without operating the injection circuit 40, and the defrosting can be promoted.

On the other hand, in a case where there is not the heating required, in the step S33, the controller 32 executes the simple hot gas defrosting mode in which the refrigerant discharged from the compressor 2 radiates heat only in the outdoor heat exchanger 7 and the refrigerant by which heat has been radiated returns to the compressor 2 without flowing through the heat absorber 9, and in the step S34, the injection circuit 40 is not operated. Consequently, the defrosting of the outdoor heat exchanger 7 can rapidly be executed to minimize power consumption remarkably effectively in the electric car or the like.

Additionally, in a case where the power is supplied from the external power source, in the step S27, the first dehumidifying and cooling type defrosting mode is executed in which the refrigerant discharged from the compressor 2 radiates heat in the radiator 4 and the outdoor heat exchanger 7 and the refrigerant by which heat has been radiated is decompressed and then absorbs heat in the heat absorber 9, and in the step S28, the injection circuit 40 is operated. Furthermore, in a case where the power is not supplied from the external power source, in the step S33, the simple hot gas defrosting mode is executed in which the refrigerant discharged from the compressor 2 radiates heat in the outdoor heat exchanger 7 and the refrigerant by which heat has been radiated returns to the compressor 2 without flowing through the heat absorber 9, and in the step S34, the injection circuit 40 is not operated. Therefore, during the plug-in, heating of the vehicle interior is maintained by the injection circuit 40 while performing the defrosting of the outdoor heat exchanger 7 in the first dehumidifying and cooling type defrosting mode, and when the plug-in is not performed, all the refrigerant is passed through the outdoor heat exchanger 7 to rapidly perform the defrosting without operating the injection circuit 40 in the simple hot gas defrosting mode, and decrease of power consumption can be achieved.

In this case, in a case where the controller 32 judges in the step S22 that the plug-in is not performed (the power is not supplied from the external power source) and the controller judges in the step S31 that the remaining amount of the battery is small, the controller executes the simple hot gas defrosting mode and does not operate the injection circuit 40, or the controller executes the hot gas defrosting mode and does not operate the injection circuit 40. Consequently, in the case where the plug-in is not performed and the battery remaining amount is small, the simple hot gas defrosting mode or the hot gas defrosting mode is executed in which the injection circuit 40 is not operated, thereby precisely enabling defrosting control in which it is judged whether or not the plug-in is performed and additionally, the remaining amount of the battery is judged.

Embodiment 3

(10) Defrosting Mode (Embodiment 3)

Figure 15:
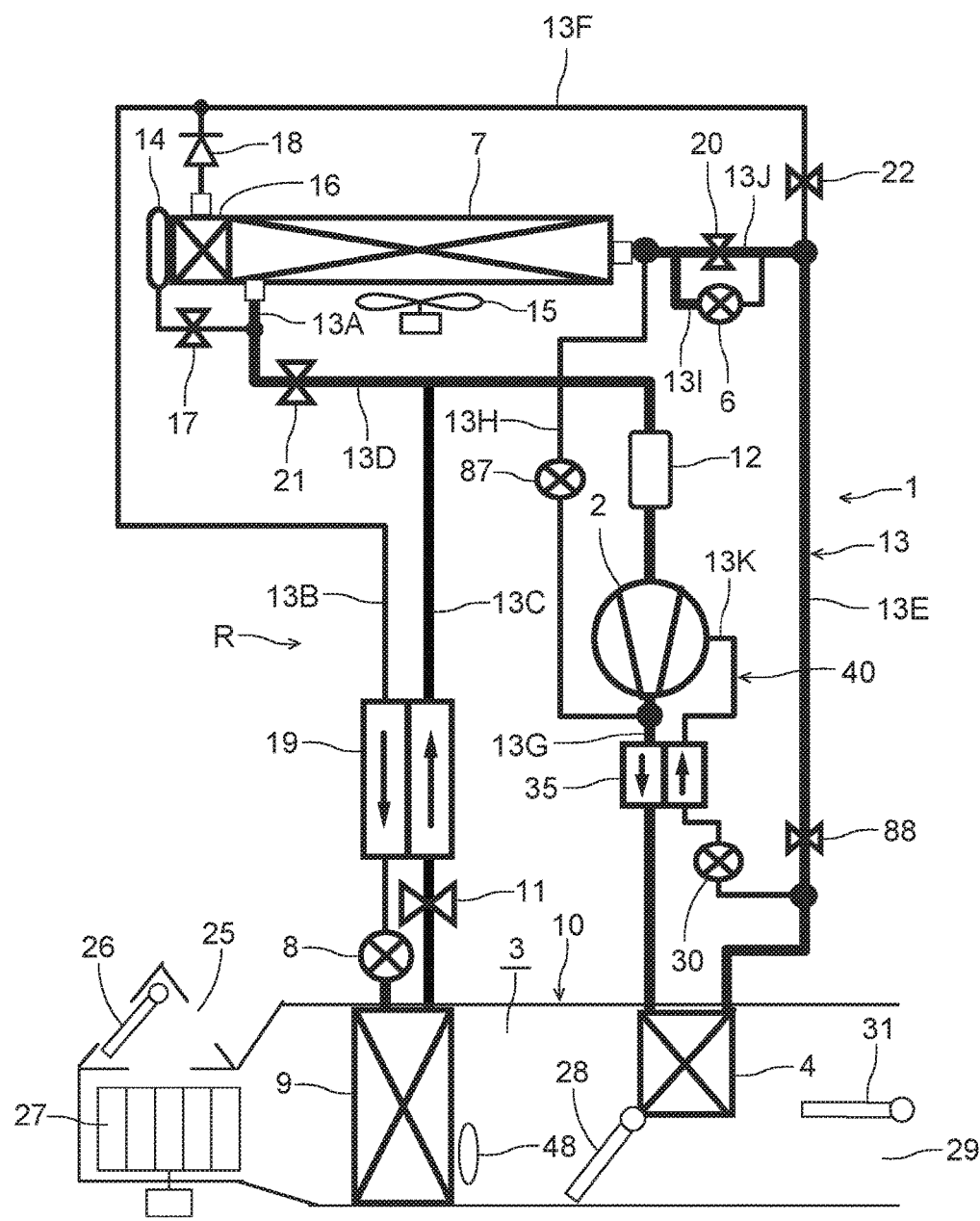
FIG. 15 is a constitutional view of an air conditioning device for vehicle of still another embodiment to which the present invention is applied.
Figure 16:
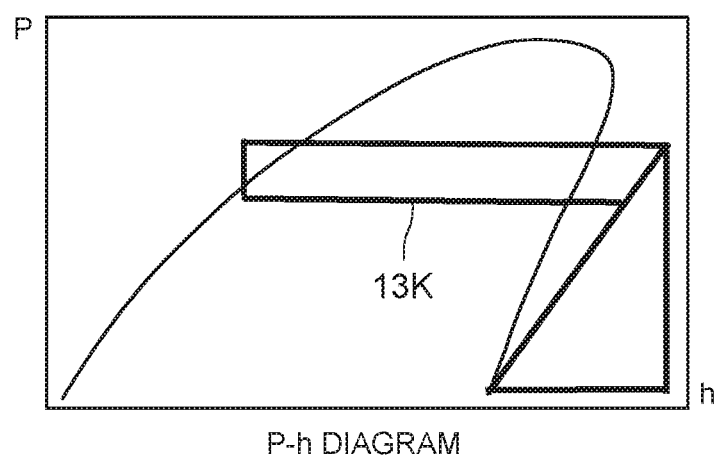
FIG. 16 is a P-h diagram of the constitution of FIG. 15 in a hot gas defrosting mode.

Next, still another embodiment of the air conditioning device for vehicle 1 of the present invention will be described with reference to FIG. 15 to FIG. 17. It is to be noted that in FIG. 15, components denoted with the same reference numerals as in FIG. 1 produce the same or similar functions. In this case, in the air conditioning device for vehicle 1, a refrigerant pipe 13G on a discharge side of a compressor 2 branches to a hot gas pipe (a refrigerant pipe) 13H, and this branched hot gas pipe 13H is opened in defrosting of an outdoor heat exchanger 7 so that a high-temperature refrigerant (a hot gas) discharged from the compressor 2 directly flows into the outdoor heat exchanger 7, and the hot gas pipe communicates to be connected to a refrigerant pipe 13I between an outdoor expansion valve 6 and the outdoor heat exchanger 7 via a flow rate adjustment valve (a hot gas valve) 87 to adjust a flow rate of the refrigerant. Additionally, to a refrigerant pipe 13E extended out from a radiator 4 and branched to an injection circuit 40, a solenoid valve 88 is attached which is closed in the defrosting to stop the refrigerant toward the outdoor expansion valve 6 (added as shown by broken lines in FIG. 2).

Additionally, in the case of this embodiment, a controller 32 has, as a defrosting mode, a hot gas defrosting mode in which the hot gas pipe 13H is used, in addition to the abovementioned first dehumidifying and cooling type defrosting mode, second dehumidifying and cooling type defrosting mode and simple hot gas defrosting mode, and the controller switches and executes these modes in accordance with a situation.

(10-1) Flow of Refrigerant of Hot Gas Defrosting Mode

First, flow of the refrigerant of the hot gas defrosting mode in this case will be described. In this hot gas defrosting mode, the controller 32 opens a solenoid valve 21 and closes a solenoid valve 17, a solenoid valve 20, a solenoid valve 22, and the solenoid valve 88. Additionally, the outdoor expansion valve 6 is shut off and a valve position of the flow rate adjustment valve 87 is adjusted. Further, the compressor 2 and respective blowers 15 and 27 are operated, and an air mix damper 28 is adjusted into a state where all air is passed through the radiator 4 (MH).

In consequence, a high-temperature high-pressure gas refrigerant discharged from the compressor 2 is distributed to directly flow into the outdoor heat exchanger 7 through the flow rate adjustment valve 87 and the hot gas pipe 13H.

Further, the refrigerant radiates heat in the outdoor heat exchanger 7 and adhered frost is strongly melted. The refrigerant flowing out from the outdoor heat exchanger 7 flows through a refrigerant pipe 13A, the solenoid valve 21 and refrigerant pipes 13D and 13C to return from an accumulator 12 to the compressor 2.

Additionally, the balance of the refrigerant discharged from the compressor 2 flows into the radiator 4 through a discharge side heat exchanger 35. The air in an air flow passage 3 is passed through the radiator 4, and hence the refrigerant radiates heat here, but when an injection expansion valve 30 is opened, all the refrigerant flowing out from the radiator 4 flows through the injection circuit 40, because the solenoid valve 88 is closed, and the refrigerant is returned to the middle of the compression by the compressor 2. FIG. 16 shows a P-h diagram in a case where gas injection is performed in this hot gas defrosting mode, and in this case, a part of the refrigerant which flows through the injection circuit 40 appears in addition to FIG. 12 (denoted with 13K in the drawing).

(10-2) Control of Defrosting Mode (Embodiment 3)

Next, control of the defrosting mode of this case by the controller 32 in a heating mode will specifically be described with reference to a flowchart of FIG. 17. The controller 32 reads data from each sensor in step S40 of FIG. 17 and judges in step S41 whether or not there is a defrosting required for the outdoor heat exchanger 7. It is to be noted that detection of a frosting condition of the outdoor heat exchanger 7 in this case is similar to the case of the step S2 of FIG. 10 mentioned above, and hence description is omitted.

In a case where the controller 32 judges in the step S41 that there is the defrosting required, the controller advances from the step S41 to step S42, and judges whether or not a car is plugged in at present. Further, during the plug-in, the controller advances from the step S42 to step S43. It is to be noted that when the plug-in is not performed, the controller advances to step S55 and judges whether or not a remaining amount of a battery is lower than a predetermined value in the same manner as described above. Further, also in a case where the battery remaining amount of a predetermined value or more is left, the controller advances to the step S43.

The controller 32 judges in the step S43 whether or not a current outdoor air temperature Tam detected by an outdoor air temperature sensor 33 is lower than the abovementioned predetermined value T2. Further, in a case where an environment in which the outdoor air temperature Tam is lower than T2 is judged in the step S43, the controller 32 advances to step S44, and judges whether or not a passenger is in a vehicle interior at present, on the basis of an output of a passenger sensor 57.

In a case where it is judged in the step S44 that the passenger is in a vehicle, the controller 32 advances to step S45 to judge whether or not there is a heating required. In the case where it is judged that there is the heating required as described above, the controller 32 judges whether or not a vehicle interior temperature detected by an indoor air temperature sensor 37 is lower than a predetermined value T2 (e.g., 0° C.). In a case where the vehicle interior is cold at present and the vehicle interior temperature is lower than the predetermined value T2, the controller 32 advances to step S47, and defines a target radiator pressure (a target high pressure) PCO as the abovementioned predetermined value P1A (P1A≥P1 and a higher pressure).

Next, the controller advances to step S48 and step S49 and executes the abovementioned hot gas defrosting mode. That is, in the step S48, the outdoor expansion valve 6 is shut off and the air mix damper 28 is adjusted into the above MH. Additionally, the indoor blower 27 is coordinated and controlled at an outlet temperature and a suction changing damper 26 is adjusted into an indoor air circulating mode.

Additionally, in the step S49, the controller 32 executes F/B control of the compressor 2 on the basis of the target radiator pressure PCO as in the abovementioned control block of FIG. 13. Additionally, the flow rate adjustment valve (the hot gas valve) 87 is fully opened, and a part of the high-temperature refrigerant discharged from the compressor 2 directly flows into the outdoor heat exchanger 7 through the hot gas pipe 13H and radiates heat to perform the defrosting. Additionally, the injection circuit 40 is operated, the balance of the refrigerant discharged from the compressor 2 radiates heat in the radiator 4, and then the injection circuit 40 returns the refrigerant to the middle of the compression by the compressor 2 to perform the gas injection. In this case, as in a control block of FIG. 7, the controller 32 executes F/B control of a valve position of the injection expansion valve 30 on the basis of an injection superheat degree SHinj, and controls a gas injection amount.

Next, the controller 32 advances to step S50, operates (ON) the outdoor blower 15 when an outdoor heat exchanger temperature TXO is a predetermined value TX1 (e.g., +25° C.) or more, and forcibly passes the outdoor air through the outdoor heat exchanger 7 in the same manner as described above. On the other hand, when the outdoor heat exchanger temperature TXO is lower than a predetermined value TX2 (e.g., +20° C. which has a predetermined hysteresis to TX1), the controller stops (OFF) the outdoor blower 15.

Additionally, in a case where it is judged in step S46 that the vehicle interior temperature is high and is the predetermined value T2 or more, the controller 32 advances to step S51 and defines the target radiator pressure (the target high pressure) PCO as the abovementioned predetermined value P1 (the high pressure). Next, the controller advances to the step S52 and step S53 and executes the abovementioned first dehumidifying and cooling type defrosting mode. That is, the refrigerant radiates heat in the radiator 4 and the outdoor heat exchanger 7 and absorbs heat in a heat absorber 9. In consequence, the outdoor heat exchanger 7 is defrosted. Additionally, as in the abovementioned control block of FIG. 6, F/B control of the outdoor expansion valve 6 is executed on the basis of the target radiator pressure PCO and the air mix damper 28 is adjusted into the above MH. Additionally, the indoor blower 27 is coordinated and controlled at the outlet temperature and the suction changing damper 26 is adjusted into the indoor air circulating mode.

Additionally, in the step S53, the controller 32 executes the F/B control of the compressor 2 on the basis of a target heat absorber temperature TEO as in the abovementioned control block of FIG. 5 (in the same manner as in a cooling or dehumidifying and cooling mode). Additionally, the injection circuit 40 is operated and the gas injection is performed in the middle of the compression by the compressor 2. In this case, as in the control blocks of FIG. 7 and FIG. 8, the controller 32 executes the F/B control of the valve position of the injection expansion valve 30 on the basis of an injection superheat degree SHinj as in FIG. 7, when a number of revolution NC of the compressor 2 is a low number of revolution of a predetermined value N1 or less, thereby controlling the gas injection amount. Additionally, when the number of revolution NC of the compressor 2 is a high number of revolution higher than the predetermined value N1, the controller executes the F/B control of the valve position of the injection expansion valve 30 on the basis of the target radiator pressure PCO as in FIG. 8, thereby controlling the gas injection amount. Additionally, the injection superheat degree SHinj is adjusted to be higher than 10 degrees in the same manner as described above. Next, the controller 32 advances to the step S50 to control an operation of the outdoor blower 15 in the same manner as described above.

On the other hand, in a case where it is judged in the step S45 that there is not the heating required, the controller 32 advances to step S54 to define the target radiator pressure PCO as the abovementioned predetermined value P2 (a medium pressure, P1≥P2), and next advances to step S57 and step S58 to execute the hot gas defrosting mode. That is, in the step S57, the outdoor expansion valve 6 is fully opened and the air mix damper 28 may be adjusted at any position. Additionally, the indoor blower 27 stops.

Additionally, in the step S58, the controller 32 executes the F/B control of the compressor 2 on the basis of the target radiator pressure PCO as in the abovementioned control block of FIG. 13. Additionally, the flow rate adjustment valve (the hot gas valve) 87 is fully opened, and a part of the high-temperature refrigerant discharged from the compressor 2 directly flows into the outdoor heat exchanger 7 through the hot gas pipe 13H and radiates heat to perform the defrosting. It is to be noted that the injection circuit 40 is not operated (OFF) and all the high-temperature refrigerant from the compressor 2 is used to perform the defrosting of the outdoor heat exchanger 7. Next, the controller 32 advances to the step S50 and controls the operation of the outdoor blower 15 in the same manner as described above.

Additionally, in a case where it is judged in the step S44 that the passenger is not in the vehicle and a case where it is judged in the step S55 that the battery remaining amount is lower than the predetermined value, the controller 32 advances to step S56 to define the target radiator pressure PCO as P2 (the medium pressure), and next advances to the step S57 to execute the above hot gas defrosting mode. That is, in the case where the passenger is not in the vehicle or the case where the battery remaining amount is small, the high-temperature refrigerant is concentrated on the defrosting of the outdoor heat exchanger 7.

Additionally, in a case where an environment in which the outdoor air temperature Tam is high and is the predetermined value T2 or more is judged in the step S43, the controller 32 advances from the step S43 to step S59, judges again whether or not the passenger is in the vehicle, and advances to the step S56 and the step S57 when the passenger is not in the vehicle. When the passenger is in the vehicle, the controller advances to step S60 to define the target radiator pressure PCO as the abovementioned predetermined value P3 (a low pressure, P1A≥P1≥P2≥P3), and advances to step S61 and step S62 to execute the abovementioned second dehumidifying and cooling type defrosting mode.

That is, when the plug-in is performed, the outdoor air temperature Tam is high and the passenger is in the vehicle, the refrigerant radiates heat in the radiator 4 and the outdoor heat exchanger 7 and absorbs heat in the heat absorber 9. Consequently, the outdoor heat exchanger 7 is defrosted. Additionally, the F/B control of the outdoor expansion valve 6 is executed on the basis of the target radiator pressure PCO as in the abovementioned control block of FIG. 6 and the air mix damper 28 is adjusted into the above MH. Additionally, the indoor blower 27 is operated at a predetermined voltage V3 and the suction changing damper 26 is adjusted into the indoor air circulating mode.

Further, the controller 32 advances to the step S62 to execute the F/B control of the compressor 2 on the basis of the target heat absorber temperature TEO as in the abovementioned control block of FIG. 5 (in the same manner as in the cooling or dehumidifying and cooling mode). Additionally, the injection circuit 40 is not operated (OFF) and the gas injection to the compressor 2 is not performed. Consequently, more high-temperature refrigerant flows through the outdoor heat exchanger 7. At this time, the injection circuit 40 does not operate, but due to the environment in which the outdoor air temperature Tam is high, any hindrance is not generated in the vehicle interior temperature.

As described above, in this embodiment, the hot gas pipe 13H is provided which can supply the refrigerant discharged from the compressor 2 directly to the outdoor heat exchanger 7, and in the case where there is the heating required, the controller 32 executes the hot gas defrosting mode in which a part of the refrigerant discharged from the compressor 2 is distributed to flow into the outdoor heat exchanger 7 through the hot gas pipe 13H and radiate heat therein without flowing through the radiator 4, the refrigerant by which heat has been radiated returns to the compressor 2 and the balance of the refrigerant radiates heat in the radiator 4, and the controller operates the injection circuit 40. In consequence, without performing the heat absorption in the heat absorber 9, the injection circuit 40 can improve the heating capability in the radiator 4 effectively especially in a situation where the vehicle interior temperature is remarkably low.

Additionally, also in this case, when the outdoor air temperature Tam is the predetermined value T2 or more, in the step S61, the controller 32 executes the second dehumidifying and cooling type defrosting mode in which the refrigerant discharged from the compressor 2 radiates heat in the radiator 4 and the outdoor heat exchanger 7 and the refrigerant by which heat has been radiated is decompressed and then absorbs heat in the heat absorber 9, and the controller does not operate the injection circuit 40. Consequently, under an environment where an outdoor air temperature Tam is high and the heating capability in the vehicle interior is easy to be maintained, more refrigerant can be supplied to the outdoor heat exchanger 7 without operating the injection circuit 40, and the defrosting can be promoted.

On the other hand, in the case where there is not the heating required for the vehicle interior, in the step S57, the controller 32 executes the hot gas defrosting mode in which a part of the refrigerant discharged from the compressor 2 is distributed to flow into the outdoor heat exchanger 7 through the hot gas pipe 13H and radiate heat therein without flowing through the radiator 4, the refrigerant by which heat has been radiated returns to the compressor 2 and the balance of the refrigerant radiates heat in the radiator 4, and the controller does not operate the injection circuit 40. Consequently, the defrosting of the outdoor heat exchanger 7 can rapidly be executed to minimize the power consumption remarkably effectively in the electric car or the like.

Additionally, in a case where a power is supplied from an external power source and a case where the vehicle interior temperature is low, the abovementioned hot gas defrosting mode is executed in the step S48, and in a case where the vehicle interior temperature is high, in the step S52, the first dehumidifying and cooling type defrosting mode is executed in which the refrigerant discharged from the compressor 2 radiates heat in the radiator 4 and the outdoor heat exchanger 7 and the refrigerant by which heat has been radiated is decompressed and then absorbs heat in the heat absorber 9, and the injection circuit 40 is operated. Furthermore, in a case where the power is not supplied from the external power source, in the step S57, the hot gas defrosting mode is executed in which a part of the refrigerant discharged from the compressor 2 flows into the outdoor heat exchanger 7 through the hot gas pipe 13H without flowing through the radiator 4, and radiates heat, the refrigerant by which heat has been radiated returns to the compressor 2 and the balance of the refrigerant radiates heat in the radiator 4, and the injection circuit 40 is not operated. Therefore, during the plug-in, heating of the vehicle interior is maintained by the injection circuit 40 while performing the defrosting of the outdoor heat exchanger 7 in the hot gas defrosting mode or the first dehumidifying and cooling type defrosting mode, and when the plug-in is not performed, all the refrigerant is passed through the outdoor heat exchanger 7 to rapidly perform the defrosting without operating the injection circuit 40 in the hot gas defrosting mode, and decrease of power consumption can be achieved.

Embodiment 4

(11) Control of Compressor in Simple Hot Gas Defrosting Mode (Including a Hot Gas Defrosting Mode) (Embodiment 4)

Figure 18:
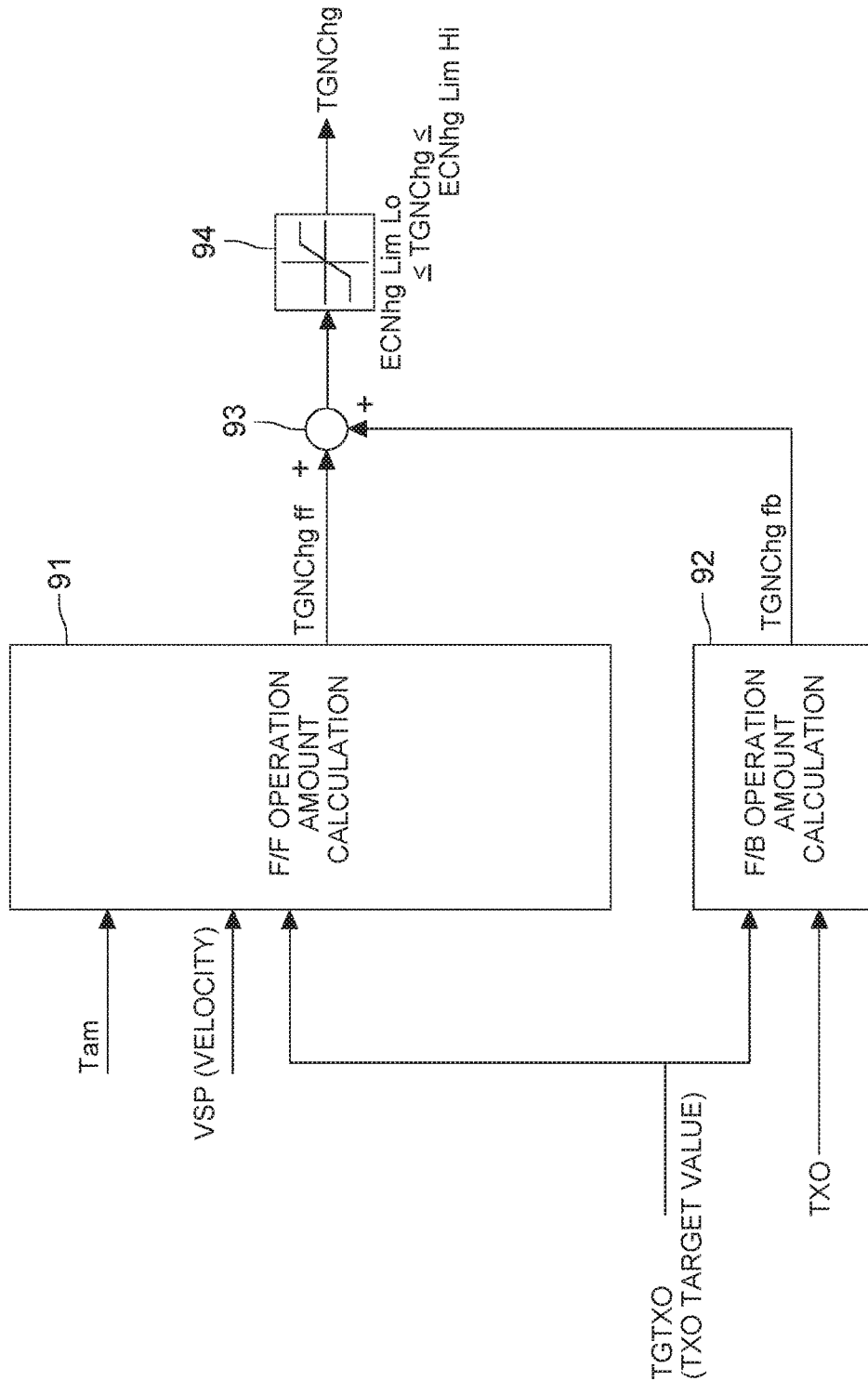
FIG. 18 is a control block diagram of a still further embodiment concerning compressor control in a simple hot gas defrosting mode and a hot gas defrosting mode by the controller of FIG. 2.

Next, FIG. 18 shows a still further embodiment of a control block of a controller 32 which determines a target number of revolution (a compressor target number of revolution) TGNChg (in this case) of a compressor 2 for the above hot gas defrosting mode and simple hot gas defrosting mode. In the above example of FIG. 13, the compressor target number of revolution TGNCh is calculated on the basis of the target radiator pressure PCO and the radiator pressure PCI, but the target number of revolution of the compressor 2 may be calculated on the basis of a target outdoor heat exchanger temperature TGTXO of an outdoor heat exchanger temperature TXO of an outdoor heat exchanger 7, and the outdoor heat exchanger temperature TXO.

That is, an F/F control amount calculation section 91 of this case of the controller 32 calculates an F/F control amount TGNChgff of the compressor target number of revolution of this case on the basis of an outdoor air temperature Tam obtained from an outdoor air temperature sensor 33, a vehicle speed VSP obtained from a velocity sensor 52, and the target outdoor heat exchanger temperature TGTXO.

It is to be noted that the target outdoor heat exchanger temperature TGTXO of this case is set to about +25° C. in consideration of a predetermined value TX1 which is a threshold value to operate an outdoor blower 15 as described above.

Additionally, an F/B control amount calculation section 92 of this case calculates an F/B control amount TGNChgfb of the compressor target number of revolution of this case on the basis of the target outdoor heat exchanger temperature TGTXO and the outdoor heat exchanger temperature TXO. Further, the F/F control amount TGNChgff calculated by the F/F control amount calculation section 91 and the amount TGNChgfb calculated by the F/B control amount calculation section 92 are added by an adder 93, limits of a controlling upper limit value and a controlling lower limit value are attached by a limit setting section 94, and then the control amount is determined as the compressor target number of revolution TGNChg of this case.

Figure 14:
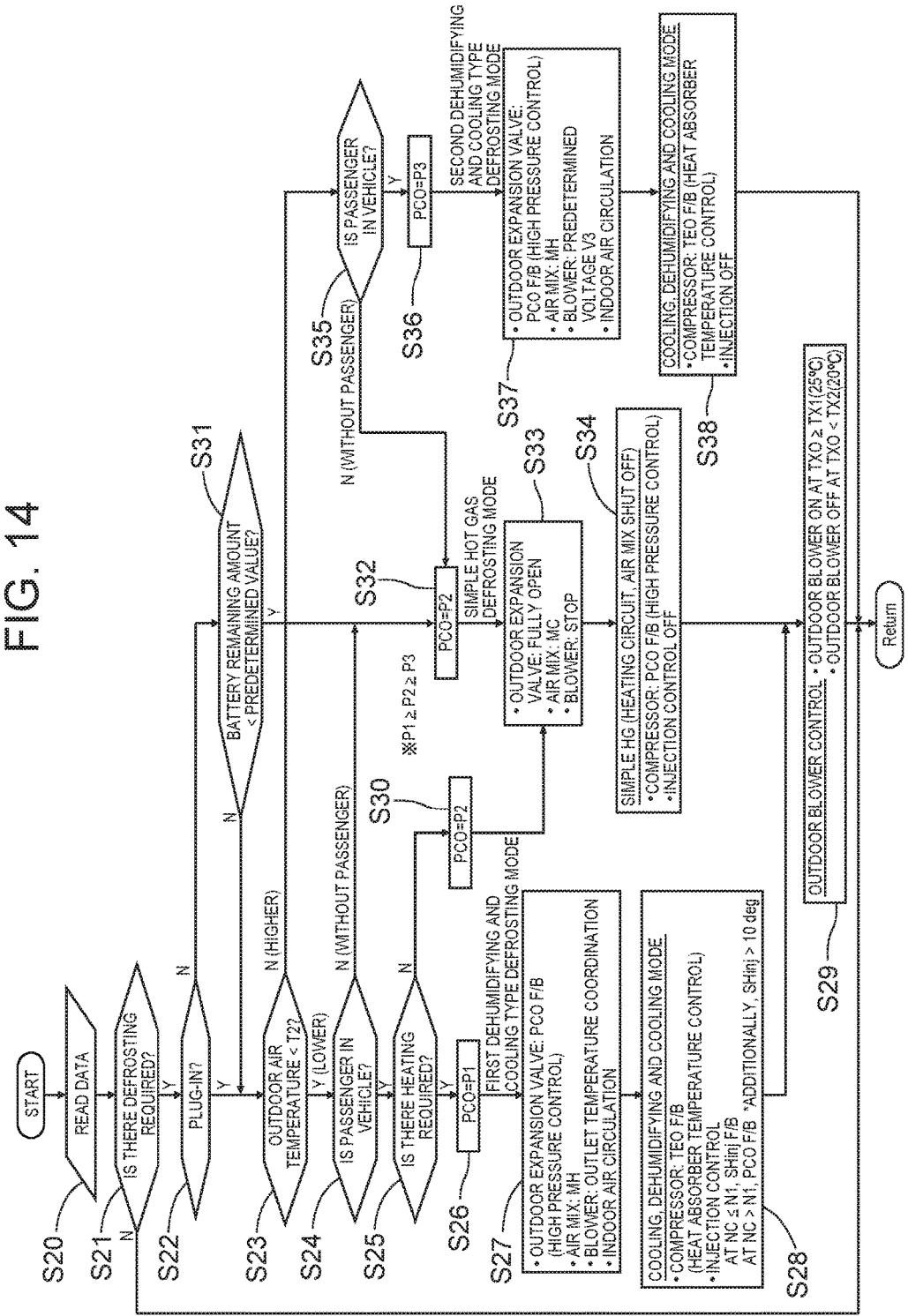
FIG. 14 is a flowchart to explain an operation of the other embodiment concerning the defrosting control of the controller of FIG. 2.
Figure 17:
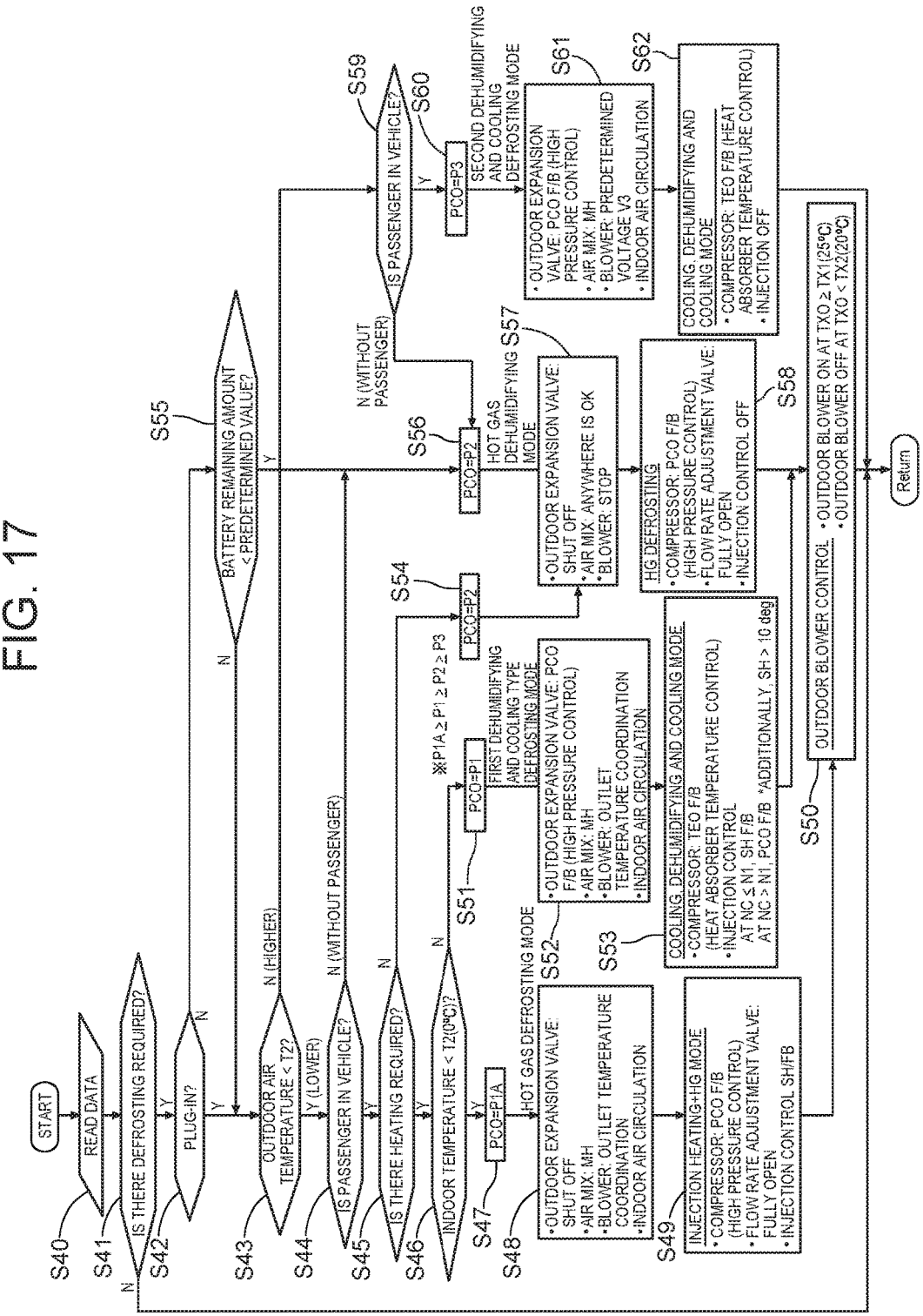
FIG. 17 is a flowchart to explain an operation concerning defrosting control of a controller in the case of the constitution of FIG. 15.

Further, in the case of this embodiment, in the control of the compressor 2 in the simple hot gas defrosting mode to be executed in the step S34 of the abovementioned flowchart of FIG. 14, the control of the compressor 2 in the hot gas defrosting mode to be executed in the step S49 of the flowchart of FIG. 17 and the control of the compressor 2 in the simple hot gas defrosting mode to be executed in the step S58 of the same flowchart, the controller 32 executes F/B control of the number of revolution of the compressor 2 on the basis of the compressor target number of revolution TGNChg calculated based on the target outdoor heat exchanger temperature TGTXO and the outdoor heat exchanger temperature TXO as described above.

It is to be noted that in the respective embodiments, the simple hot gas defrosting mode is executed in the step S34 of the flowchart of FIG. 14 and the step S57 of the flowchart of FIG. 17, but the present invention is not limited to the embodiments, and the hot gas defrosting mode may be executed.

Additionally, the defrosting control of each embodiment may be executed in a case where the vehicle speed detected by the velocity sensor 52 is a predetermined value or less. That is, the controller 32 may defrost the outdoor heat exchanger 7 only when the vehicle speed is lower than the predetermined value (e.g., 10 km/h or the like). In this case, in a situation where less outdoor air flows through the outdoor heat exchanger 7, and it is possible to improve a defrosting effect (it is to be noted that in a case where a shutter grill is present before the outdoor heat exchanger 7, the grill is closed during the defrosting).

Furthermore, in the embodiments, the present invention is applied to the air conditioning device for vehicle 1 which changes and executes the respective operation modes of the heating mode, the dehumidifying and heating mode, the dehumidifying and cooling mode and the cooling mode, but the present invention is not limited to the embodiments, and the present invention is also effective for an air conditioning device for vehicle which only performs the heating mode.

Additionally, the constitution or each numeric value of the refrigerant circuit R described in the above embodiments are not limited to the embodiments, and needless to say, they can be changed without departing from the gist of the present invention.

DESCRIPTION OF REFERENCE NUMERALS 1 air conditioning device for vehicle
2 compressor
3 air flow passage
4 radiator
6 outdoor expansion valve
7 outdoor heat exchanger
8 indoor expansion valve
9 heat absorber
11 evaporation capability control valve
17, 20, 21, 22 and 88 solenoid valve
26 suction changing damper
27 indoor blower (blower fan)
28 air mix damper
32 controller (control means)
30 injection expansion valve 40 injection circuit
35 discharge side heat exchanger
87 flow rate adjustment valve
R refrigerant circuit

The invention claimed is:

1. An air conditioning device for vehicle comprising:
a compressor which compresses a refrigerant;
an air flow passage through which air to be supplied to a vehicle interior flows;
a radiator disposed in the air flow passage to let the refrigerant radiate heat;
a heat absorber disposed in the air flow passage to let the refrigerant absorb heat;
an outdoor heat exchanger disposed outside the vehicle interior to let the refrigerant radiate or absorb heat; and
control means,
the control means being configured to let the refrigerant discharged from the compressor radiate heat in the radiator, decompress the refrigerant by which heat has been radiated and then let the refrigerant absorb heat in the outdoor heat exchanger, thereby heating the vehicle interior,
the air conditioning device for vehicle comprising:
an injection circuit which distributes a part of the refrigerant flowing out from the radiator to return the part of the refrigerant to the compressor,
wherein the control means operates the injection circuit to return the refrigerant to the compressor, when the high-temperature refrigerant is passed through the outdoor heat exchanger to perform defrosting,
wherein the control means executes a reverse cycle defrosting mode in which the refrigerant discharged from the compressor radiates heat in the outdoor heat exchanger and the refrigerant by which heat has been radiated is decompressed and then absorbs heat in the heat absorber, and the control means does not operate the injection circuit, until a vehicle interior temperature becomes lower than a predetermined value, and
in a case where the vehicle interior temperature is lower than the predetermined value, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means operates the injection circuit.

2. The air conditioning device for vehicle according to claim 1,
wherein in a case where there is a heating required for the vehicle interior, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means operates the injection circuit.

3. The air conditioning device for vehicle according to claim 1,
wherein in a case where there is a heating required for the vehicle interior, the control means executes a hot gas defrosting mode in which a part of the refrigerant discharged from the compressor is distributed to flow into the outdoor heat exchanger and radiate heat therein without flowing through the radiator and the refrigerant by which heat has been radiated returns to the compressor, and the control means operates the injection circuit.

4. The air conditioning device for vehicle according to claim 1, comprising:
an outdoor blower which passes outdoor air through the outdoor heat exchanger,
wherein when the control means defrosts the outdoor heat exchanger, the control means operates the outdoor blower in a case where a temperature of the outdoor heat exchanger is a predetermined value or more, and stops the outdoor blower in a case where the temperature is lower than the predetermined value.

5. The air conditioning device for vehicle according to claim 2,
wherein in a case where an outdoor air temperature is a predetermined value or more, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means does not operate the injection circuit.

6. The air conditioning device for vehicle according to claim 1,
wherein the control means stops introduction of outdoor air into the air flow passage, in a case where a vehicle interior temperature is lower than a predetermined value or a case where it is necessary to heat the vehicle interior, when the control means defrosts the outdoor heat exchanger.

7. The air conditioning device for vehicle according to claim 2,
wherein the control means stops introduction of outdoor air into the air flow passage, when the control means executes the dehumidifying and cooling type defrosting mode or the hot gas defrosting mode.

8. The air conditioning device for vehicle according to claim 1,
wherein the control means defrosts the outdoor heat exchanger in a case where a vehicle speed is a predetermined value or less.

9. The air conditioning device for vehicle according to claim 2, comprising:
an outdoor blower which passes outdoor air through the outdoor heat exchanger,
wherein when the control means defrosts the outdoor heat exchanger, the control means operates the outdoor blower in a case where a temperature of the outdoor heat exchanger is a predetermined value or more, and stops the outdoor blower in a case where the temperature is lower than the predetermined value.

10. The air conditioning device for vehicle according to claim 3,
wherein in a case where an outdoor air temperature is a predetermined value or more, the control means executes a dehumidifying and cooling type defrosting mode in which the refrigerant discharged from the compressor radiates heat in the radiator and the outdoor heat exchanger and the refrigerant by which heat has been radiated is decompressed and then absorbs heat in the heat absorber, and the control means does not operate the injection circuit.

11. The air conditioning device for vehicle according to claim 2,
   wherein the control means stops introduction of outdoor air into the air flow passage, in a case where a vehicle interior temperature is lower than a predetermined value or a case where it is necessary to heat the vehicle interior, when the control means defrosts the outdoor heat exchanger.

12. The air conditioning device for vehicle according to claim 3,
   wherein the control means stops introduction of outdoor air into the air flow passage, when the control means executes the dehumidifying and cooling type defrosting mode or the hot gas defrosting mode.

13. The air conditioning device for vehicle according to claim 2,
   wherein the control means defrosts the outdoor heat exchanger in a case where a vehicle speed is a predetermined value or less.

* * * * *